US012573906B2

(12) United States Patent (10) Patent No.: US 12,573,906 B2
Hori et al. (45) Date of Patent: Mar. 10, 2026

(54) MOTOR

(71) Applicant: AICHI ELECTRIC CO., LTD.,
Kasugai (JP)

(72) Inventors: Takashi Hori, Kasugai (JP); **Shoji
Mano, Kasugai (JP); Masahiro
Hasegawa,** Kasugai (JP)

(73) Assignee: AICHI ELECTRIC CO., LTD.,
Kasugai (JP)

( * ) Notice: Subject to any disclaimer, the term of this
patent is extended or adjusted under 35
U.S.C. 154(b) by 222 days.

(21) Appl. No.: 18/606,082

(22) Filed: Mar. 15, 2024

(65) Prior Publication Data

US 2024/0333062 A1 Oct. 3, 2024

(30) Foreign Application Priority Data

Mar. 29, 2023 (JP) ................................. 2023-053998

(51) Int. Cl.
*H02K 3/34* (2006.01)
*H02K 1/16* (2006.01)
(52) U.S. Cl.
CPC ................. *H02K 3/34* (2013.01); *H02K 1/16*
(2013.01); *H02K 2203/09* (2013.01)
(58) Field of Classification Search
CPC .......... H02K 1/185; H02K 1/16; H02K 3/522;
H02K 3/34; H02K 3/345; H02K 2203/09;
H02K 2203/12; H02K 5/225; H02K 5/10;
H02K 5/124; H02K 5/15; H02K 5/12;
H02K 5/1285; H02K 5/132; H02K 5/136;
H02K 7/08; H02K 7/083; H02K 7/085
USPC ................................................. 310/179–208
See application file for complete search history.

(56) References Cited

U.S. PATENT DOCUMENTS

| | | | | |
|---|---|---|---|---|
| 6,992,417 | B1 * | 1/2006 | Yamada | H02K 3/522 |
| | | | | 310/194 |
| 8,450,898 | B2 * | 5/2013 | Sears | H02K 3/522 |
| | | | | 310/194 |
| 8,917,006 | B2 * | 12/2014 | Jang | H02K 3/345 |
| | | | | 310/214 |
| 10,374,479 | B2 * | 8/2019 | Lee | H02K 3/522 |
| 11,536,492 | B2 * | 12/2022 | Kim | F04C 23/008 |

(Continued)

FOREIGN PATENT DOCUMENTS

| | | | |
|---|---|---|---|
| JP | 2004215325 A | 7/2004 | |
| JP | 2021083218 A * | 5/2021 | ............. H02K 3/325 |
| WO | 2017138534 A1 | 8/2017 | |

OTHER PUBLICATIONS

Unpublished U.S. Appl. No. 18/606,098, first named inventor:
Takashi Hori, filed Mar. 15, 2024.

*Primary Examiner* — Maged M Almawri
(74) *Attorney, Agent, or Firm* — J-TEK LAW PLLC;
Jeffrey D. Tekanic; Scott T. Wakeman

(57) ABSTRACT

A motor includes a rotor and a stator having a tubular stator
core and first and second electrical insulators on axially
opposite ends of the stator core. The stator core includes a
yoke and a plurality of radially inwardly extending teeth
supporting winding parts of three phase stator windings and
a cover mounted over the first electrical insulator. The cover
includes a peripheral wall and a top wall, and the peripheral
wall includes a locking finger having a radially outwardly
extending claw that engages a locking surface of the first
insulator assembly. The top wall of the cover at the location
of the locking finger is imperforate.

13 Claims, 17 Drawing Sheets

(56) References Cited

U.S. PATENT DOCUMENTS

| | | | | |
|---|---|---|---|---|
| 11,652,375 B2 * | 5/2023 | Shin | H02K 15/021 | 310/215 |
| 11,713,754 B2 * | 8/2023 | Guntermann | H02K 3/345 | 310/40 R |
| 12,136,860 B2 * | 11/2024 | Naderer | H02K 3/24 | |
| 12,149,139 B2 * | 11/2024 | Araki | H02K 1/148 | |
| 2004/0245882 A1 * | 12/2004 | Horie | H02K 3/522 | 310/194 |
| 2004/0252001 A1 * | 12/2004 | Yamada | H02K 3/522 | 336/198 |
| 2006/0012261 A1 * | 1/2006 | Ku | H02K 3/345 | 310/67 R |
| 2009/0324435 A1 * | 12/2009 | Sears | H02K 3/522 | 310/215 |
| 2011/0109189 A1 * | 5/2011 | Taema | H02K 15/095 | 310/215 |
| 2012/0080976 A1 * | 4/2012 | Oka | H02K 3/522 | 310/215 |
| 2012/0086299 A1 * | 4/2012 | Hsu | H02K 3/38 | 310/215 |
| 2012/0175992 A1 * | 7/2012 | Jang | H02K 3/522 | 310/215 |
| 2015/0008769 A1 * | 1/2015 | Uchitani | H02K 9/223 | 310/43 |
| 2015/0035404 A1 * | 2/2015 | Taema | H02K 3/345 | 310/208 |
| 2018/0351428 A1 * | 12/2018 | Okamoto | H02K 3/28 | |
| 2021/0351637 A1 * | 11/2021 | Chung | H02K 1/146 | |

* cited by examiner

MOTOR

CROSS-REFERENCE

The present application claims priority to Japanese patent application serial number JP 2023-053998 filed on Mar. 29, 2023, the contents of which are incorporated fully herein by reference.

TECHNICAL FIELD

The present disclosure relates to a motor in which two electrical insulator assemblies are respectively arranged on opposite sides of a stator core in an axial direction, and more particularly to a motor in which a cover is mounted on one of the electrical insulator assemblies.

BACKGROUND

In so-called eco-friendly cars such as hybrid vehicles (HV), electric vehicles (EV) and fuel cell vehicles (FCV), a compressor (which may be referred to as an "electric compressor") in which a compression mechanism part is driven by a motor is used as a compressor for an air conditioner. For example, a motor disclosed in JP 2004-215325 A can be used as the motor for driving the compression mechanism part. The motor disclosed in JP 2004-215325 A includes a rotor and a stator.

The stator includes a stator core, first and second electrical insulator assemblies (which may be referred to as "resin bobbins", "polymer bobbins", "bobbins" or "insulators") arranged on first and second sides of the stator core in an axial direction, a stator winding, and a cover mounted on the first electrical insulator assembly. The cover has a peripheral wall that is arranged outside an outer wall part of the first electrical insulator assembly and a top wall that is arranged on the first side of the outer wall part in the axial direction.

The cover is mounted on the first electrical insulator assembly via mounting mechanisms. Each of the mounting mechanisms includes a locking piece formed on the peripheral wall of the cover and an engagement recess formed in the outer wall part of the first electrical insulator assembly. The locking piece has a claw that is formed at an end part on the second side in the axial direction and protrudes inward in a radial direction. The engagement recess has a locking surface that is configured to be engaged by the claw of the locking piece.

An insulation distance between the stator winding arranged on the first electrical insulator assembly and any other electrical component can be increased (i.e. the dielectric strength can be improved) by the cover being mounted on the first electrical insulator assembly.

SUMMARY

Recently, due to an increase in the power supply voltage (400V or more, particularly 400 to 1500V) used in some vehicles, a motor designed for high voltage operation is also required to be used as a motor in an electric compressor for a vehicle.

In the motor disclosed in JP 2004-215325 A, the claw of the locking piece protrudes radially inward. When the cover is formed by a polymer having electrical insulating properties, an opening through the top wall of the cover is formed at a position corresponding to each of the locking pieces.

The above-mentioned known motor is designed for low voltage operation so that an insulation distance is adequate even if the opening is formed in the top wall of the cover.

However, in a motor designed for high voltage operation, the insulation distance is decreased due to the presence of the opening formed in the top wall of the cover, and this may lead to dielectric breakdown.

Accordingly, it is one non-limiting object of the present disclosure to disclose techniques for mounting a cover on an electrical insulator assembly while preventing a reduction in insulation performance even when a high-voltage power supply is used.

The present disclosure relates to a motor that includes a rotor and a stator.

The stator includes a tubular stator core extending in an axial direction, first and second electrical insulator assemblies that are respectively arranged (disposed) on a first side and a second side of the stator core in the axial direction, a stator winding and a cover.

The stator core has a yoke extending in a circumferential direction around an axis of the stator core and teeth each extending radially inward from the yoke.

Each of the first and second electrical insulator assemblies has an outer wall part, inner wall parts and body parts. The outer wall part extends in the circumferential direction and the axial direction. The inner wall parts are arranged radially inward of the outer wall part and are spaced apart from each other in the circumferential direction and extend in the circumferential direction and the axial direction. The body parts are arranged on the stator core side in the axial direction between the outer wall part and the inner wall parts and extend radially.

The stator winding includes winding parts (windings) respectively wound around the teeth of the stator core.

The cover has a peripheral wall and a top wall. The peripheral wall extends in the circumferential direction and the axial direction and is arranged radially outside the outer wall part of the first electrical insulator assembly. The top wall extends radially and in the circumferential direction and is arranged (disposed) on the first side of the outer wall part of the first electrical insulator assembly in the axial direction.

The peripheral wall of the cover has locking fingers each of which is formed (provided) at each of first positions spaced apart from each other in the circumferential direction. The outer wall part of the first electrical insulator assembly has locking surfaces each of which is formed (defined) at each of second positions spaced apart from each other in the circumferential direction corresponding to each of the first positions. Each of the locking surfaces is configured to be engageable with the respective/corresponding locking finger formed at the corresponding first position.

The cover is mounted on the first electrical insulator assembly by respectively engaging the locking fingers formed on the peripheral wall of the cover with the locking surfaces formed on the outer wall part of the electrical insulator assembly.

In the motor of this disclosure, an opening through the top wall of the cover in the axial direction is not formed (provided) at a position corresponding to at least one of the first positions. The at least one of the first positions corresponds, for example, to the first position located in the vicinity of a position where an electrical component is arranged on the outside of the outer wall part of the first electrical insulator assembly.

In the motor of this disclosure, the cover can be mounted on the electrical insulator assembly while preventing a reduction in electrical insulation performance even when a high-voltage power supply is used to energize the motor.

In one aspect of the motor according to this disclosure, a first locking piece may be formed (provided, disposed) at the at least one of the first positions of the peripheral wall of the cover. The first locking piece has a first claw protruding radially outward.

In addition, a projection may be formed (provided, disposed) at at least one of the second positions that corresponds to the at least one of the first positions of the outer wall part of the first electrical insulator assembly and protrudes radially outward. A first engagement recess is formed in the projection and is configured to be engageable (engaged) with the first claw of the first locking piece.

Because the first locking piece having the first claw protruding radially is formed (provided, disposed) at the at least one of the first positions of the peripheral wall of the cover, for example, in an embodiment in which the cover is formed of a polymer (resin) having electrical insulating properties, an opening through the top wall of the cover in the axial direction is not formed at a position of the top wall of the cover that corresponds to the at least one of the first positions. This prevents a reduction in electrical insulating performance that would otherwise be caused by the presence of the opening formed in the top wall of the cover.

The at least one of the first positions is set to (selected to be), for example, a position (or its vicinity) where an electrical component is arranged (disposed) on the outside of the outer wall part of the first electrical insulator assembly.

In this aspect, a reduction in electrical insulation performance can be prevented with a simple structure.

In another aspect of the motor according to this disclosure, the first locking piece may extend in the axial direction. Furthermore, the first locking piece may be configured such that an end part of the first locking piece on the second side in the axial direction can be elastically deformed in a radial direction around an end part of the first locking piece on the first side in the axial direction. Thus, the end part on the first side in the axial direction may be formed (provided, defined) as a fixed end, and the end part on the second side in the axial direction may be formed (provided, defined) as a free end. Furthermore, the first claw protruding radially outward may be formed (provided, defined) on the end part of the first locking piece on the second side in the axial direction.

In this aspect, the first locking piece can be easily formed.

In another aspect of the motor according to this disclosure, the first engagement recess may have an insertion opening that is formed on the first side in the axial direction such that the first claw of the first locking piece can be passed through the insertion opening. Furthermore, the first engagement recess may have a first locking surface that is formed (provided, disposed) on the second side in the axial direction from the insertion opening and is configured to be engageable (engaged 0 with the first claw of the first locking piece.

In this aspect, the first engagement recess, to (in) which the first claw protruding radially outward from the first locking piece can be locked, can be easily formed.

In another aspect of the motor according to this disclosure, a second locking piece may be formed (provided, disposed) at each of the first positions other than the at least one of the first positions of the peripheral wall of the cover. The second locking piece may have a second claw protruding radially inward.

Furthermore, a second engagement recess may be formed (provided, disposed) at each of the second positions other than the at least one of the second positions corresponding to the at least one of the first positions of the outer wall part of the first electrical insulator assembly. The second engagement recess may have a second locking surface configured to be engageable (engaged) with the second claw of the second locking piece.

In this aspect, the second locking piece and the second engagement recess can be easily formed.

In another aspect of the motor according to this disclosure, the projection formed on the outer wall part of the first electrical insulator assembly may include a positioning projection protruding toward the second side (stator core side) in the axial direction.

Furthermore, a positioning recess that extends in the axial direction may be formed (provided, disposed) on an outer peripheral surface of the stator core. The positioning recess may be open on the first side in the axial direction and configured such that the positioning projection can be inserted therein.

The first electrical insulator assembly may be configured to be positioned on the stator core by inserting the positioning projection into the positioning recess. Thus, the position of the first electrical insulator assembly relative to the stator core in the circumferential direction is defined.

In this aspect, the first electrical insulator assembly can be easily positioned and assembled on the stator core.

In another aspect of the motor according to this disclosure, the stator winding may consist of first, second and third phase stator windings. Each of the phase stator windings includes the winding parts, a first lead part and a second lead part. Each of the winding parts is wound around one of the teeth of the stator core. The first lead part may be connected to a power supply. The second lead part may be connected in common.

The stator may include a neutral point bus bar to which the second lead parts of the first to third phases stator windings may be connected in common.

The cover may include at least one wall part protruding from the top wall toward the second side (stator core side) in the axial direction. The at least one wall part may define a recess that extends in the circumferential direction and the axial direction and is open on the second side in the axial direction.

The neutral point bus bar may be mounted on the outer wall part of the first electrical insulator assembly and located within the recess of the cover.

The neutral point bus bar can be mounted on the outer wall part of the first electrical insulator assembly by using various methods.

In this aspect, an insulation distance between the neutral point bus bar and the winding parts can be increased.

According to the motor of the present disclosure, the cover can be mounted on the electrical insulator assembly while preventing a reduction in electrical insulation performance even when a high-voltage power supply is used to energize (power) the motor.

DETAILED DESCRIPTION OF THE EMBODIMENT

Figure 1:
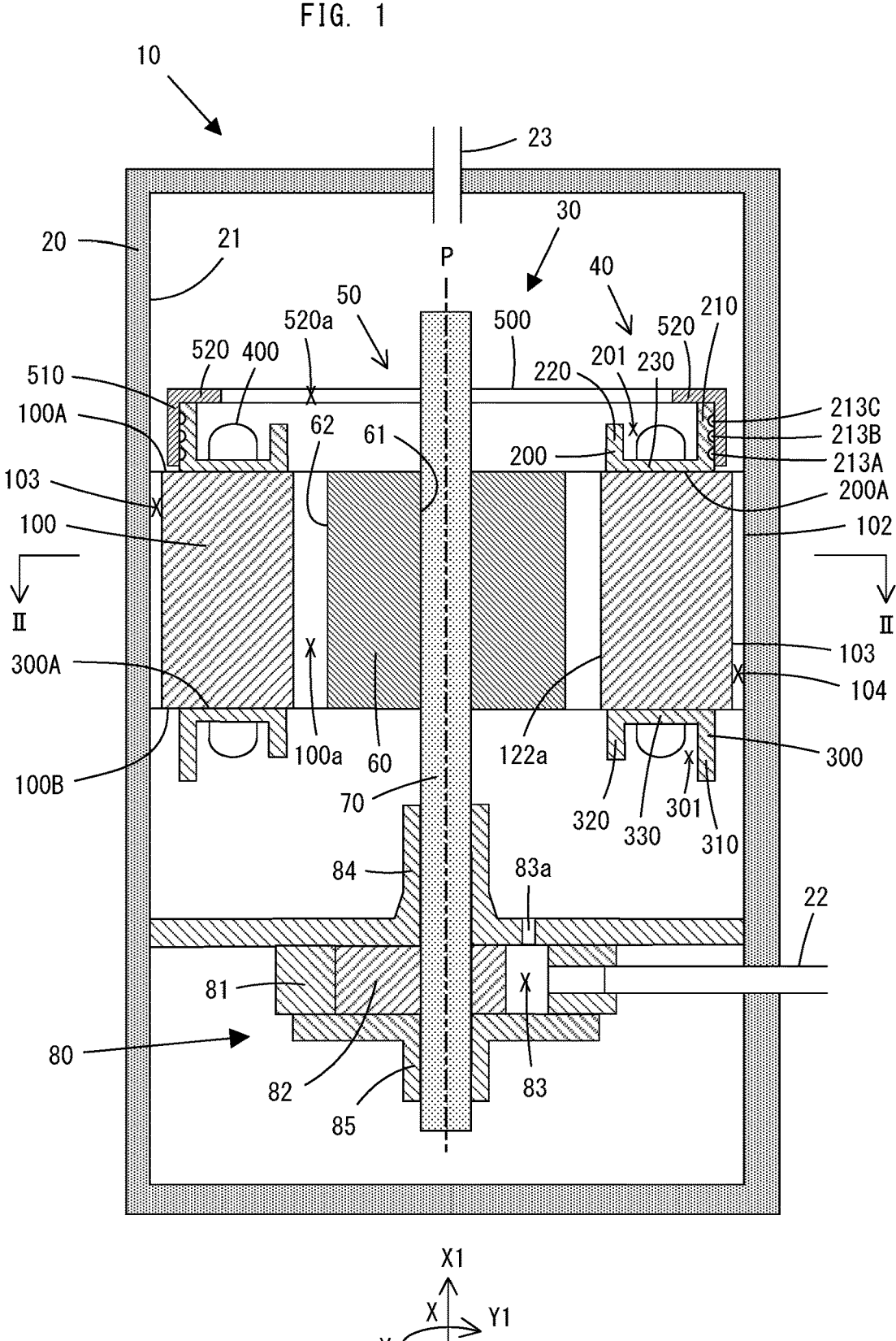
FIG. 1 is a partial, sectional view of a compressor of an embodiment of the present disclosure.

A representative embodiment of a motor according to the present disclosure will be described with reference to the drawings.

In this description, the term "axial direction" refers to an extending direction (shown by X in FIGS. 1 and 2) of an axis P of a stator core 100. The axis P of the stator core 100 corresponds to a rotation center line of a rotor 50 when the rotor 50 is arranged to be rotatable relative to a stator 40.

The term "circumferential direction" refers to a circumferential direction (shown by Y in FIG. 2) around the axis P as viewed from one side in the axial direction.

The term "radial direction" refers to an extending direction of any line passing through the axis P as viewed from the one side in the axial direction. The term "inner side (inside, inward) in the radial direction" or "radially inner side" refers to the axis P side in the radial direction and the term "outer side (outside, outward) in the radial direction" or "radially outer side" refers to the opposite side to the axis P in the radial direction.

As for electrical insulator assemblies (a first electrical insulator assembly 200, a second electrical insulator assembly 300) and a cover 500, the terms "axial direction", "circumferential direction" and "radial direction" respectively refer to the "axial direction", "circumferential direction" and "radial direction" in a state in which the electrical insulator assemblies and the cover 50 are mounted on the stator core 100.

Furthermore, in FIG. 1, the side shown by an arrow X1 (upper side in FIG. 1) and the side shown by an arrow X2 (lower side in FIG. 1) are defined as a "first side in the axial direction" and a "second side in the axial direction", respectively.

Figure 2:
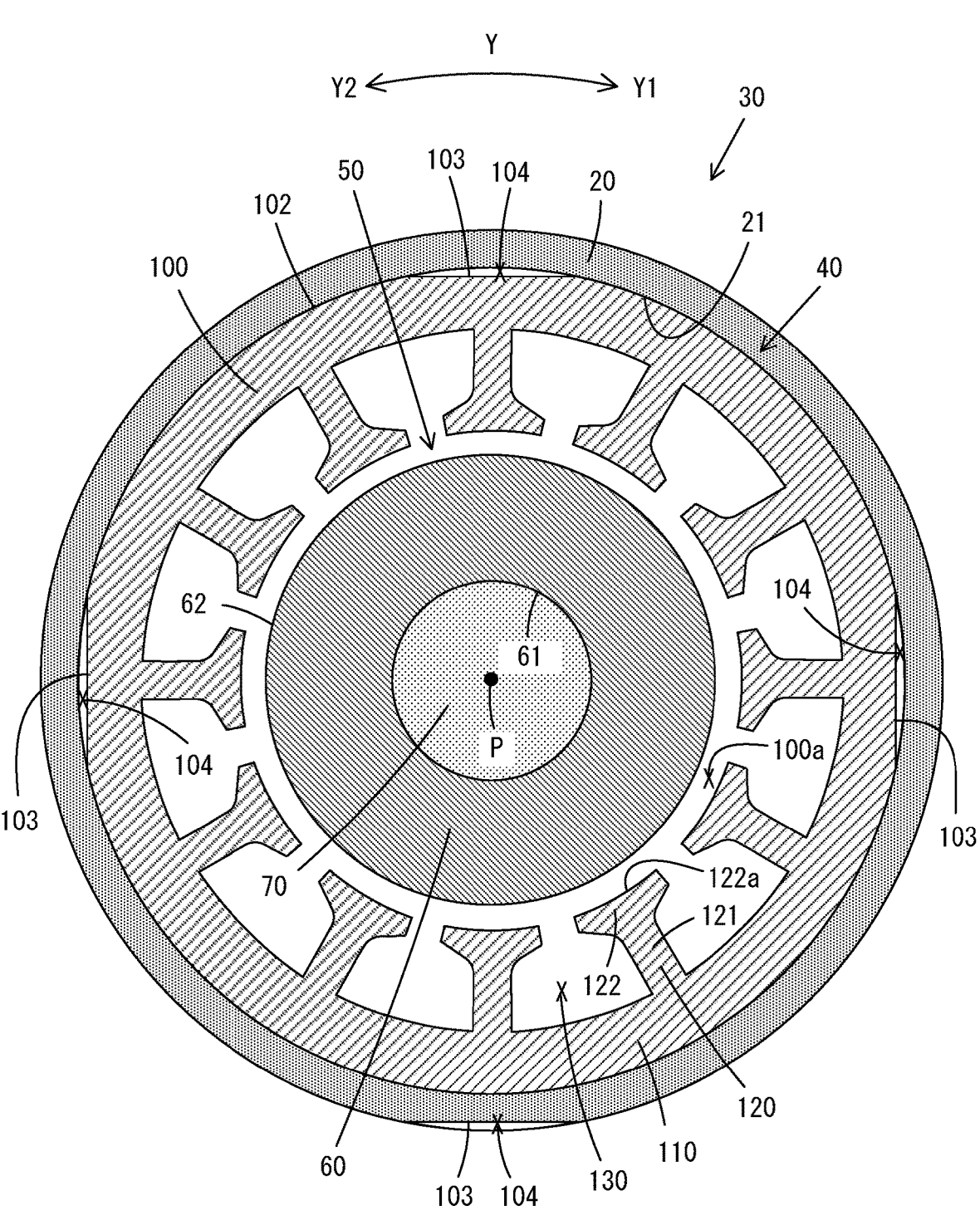
FIG. 2 is a sectional view taken in the direction of line II-II in FIG. 1.

Furthermore, in FIGS. 1 and 2, the side (clockwise side) shown by an arrow Y1 and the side (counterclockwise side) shown by an arrow Y2 are defined as a "first side in the circumferential direction" and a "second side in the circumferential direction", respectively.

The "first side in the axial direction" and the "second side in the axial direction" may be defined in reverse, and the "first side in the circumferential direction" and the "second side in the circumferential direction" may be defined in reverse.

A compressor 10 of one embodiment of the present teachings and a motor 30 of one embodiment of the present teachings that can be advantageously used in the compressor 10 will be described with reference to FIGS. 1 to 16.

The compressor 10 includes a housing 20, the motor 30 and a compression mechanism part 80. The motor 30 and the compression mechanism part 80 are housed in a housing interior space that is defined by a housing inner peripheral surface 21 of the housing 20. The housing interior space is closed.

The housing 20 is provided with a suction pipe 22 and a discharge pipe 23.

The compression mechanism part 80 compresses a working medium (such as a "refrigerant" or a "coolant") for transferring thermal energy. For example, an HFC (hydrofluorocarbon) refrigerant may be used as the working medium.

The compression mechanism part 80 includes a cylinder 81, an eccentric rotor 82 that is rotated by a rotary shaft 70, and a compression chamber 83. The rotary shaft 70 is rotatably supported by bearings 84, 85. When the eccentric rotor 82 is rotated by rotation of the rotary shaft 70, the working medium drawn through the suction pipe 22 is compressed within the compression chamber 83. Then, the compressed working medium is discharged from the discharge pipe 23 via an outlet port 83$a$ and a passage provided in the motor 30.

The arrangement position (the arrangement position in the up-down direction or in the left-right direction) of the compression mechanism part 80 and the motor 30 can be appropriately changed. A known compression mechanism part is used as the compression mechanism part 80.

The motor 30 includes a stator 40 and a rotor 50.

The rotor 50 includes a rotor core 60 and a rotatable shaft 70. The rotor core 60 has a tubular shape and has a rotor core inner peripheral surface 61 and a rotor core outer peripheral surface 62. The rotatable shaft 70 is inserted (for example, press-fitted) into a rotatable shaft insertion hole that is defined by the rotor core inner peripheral surface 61.

The stator 40 includes a stator core 100, the first electrical insulator assembly 200, the second electrical insulator assembly 300, a stator winding 400, a neutral point bus bar 410 and a cover 500, as will be described in further detail below.

The stator core 100 is formed (composed) of a stack of laminated electromagnetic steel sheets.

The stator core 100 has a tubular shape extending along the axis P of the stator core 100. The stator core 100 has stator core end surfaces 100A and 100B on the first and second sides in the axial direction and has a stator core outer peripheral surface 102 on the radially outer side and a stator core inner peripheral surface on the radially inner side. The stator core inner peripheral surface is formed by tooth tip surfaces 122$a$ (described below) of each of a plurality of teeth 120.

The stator core 100 includes a yoke 110 and the teeth 120 as shown in FIG. 2.

The yoke 110 extends in the circumferential direction around the axis P. The teeth 120 are spaced apart from each other in the circumferential direction and extend radially inward from the yoke 110.

Each of the teeth 120 has a tooth base 121 and a tooth tip 122. The tooth base 121 extends radially inward from the yoke 110. The tooth tip 122 is formed (provided, disposed, defined) on the radially inner side of the tooth base 121 and extends in the circumferential direction. The tooth tip 122 has a circular-arc-shaped tooth tip surface 122a on the radially inner side.

Pairs of the teeth 120 that are adjacent to each other in the circumferential direction respectively define slots 130 therebetween.

The tooth tip surfaces 122a form (define) the stator core inner peripheral surface. Furthermore, the tooth tip surfaces 122a define a stator core interior space 100a in which the rotor 50 (rotor core 60) is arranged.

The stator core 100 is housed in the housing interior space with the stator core outer peripheral surface 102 in close contact with the housing inner peripheral surface 21. In this embodiment, the housing inner peripheral surface 21 and the stator core outer peripheral surface 102 have a circular (or generally circular) section.

Part of the circular (or generally circular) stator core outer peripheral surface 102 is flattened to form flat (notched) surfaces 103. The flat surfaces 103 and the housing inner peripheral surface 21 define a passage 104 extending in the axial direction. The cooling medium flows through the passage 104.

The sectional shapes of the housing inner peripheral surface 21, the stator core outer peripheral surface 102 and the passage 104 can be appropriately changed.

The first electrical insulator assembly 200 and the second electrical insulator assembly 300 are formed of a material having insulating properties. In this embodiment, a polymer having electrical insulating properties is used.

The first electrical insulator assembly 200 (hereinafter simply referred to as a "first assembly 200") is arranged on the first side of the stator core 100 in the axial direction such that an end surface 200A of the first assembly 200 faces the stator core end surface 100A.

Figure 4:
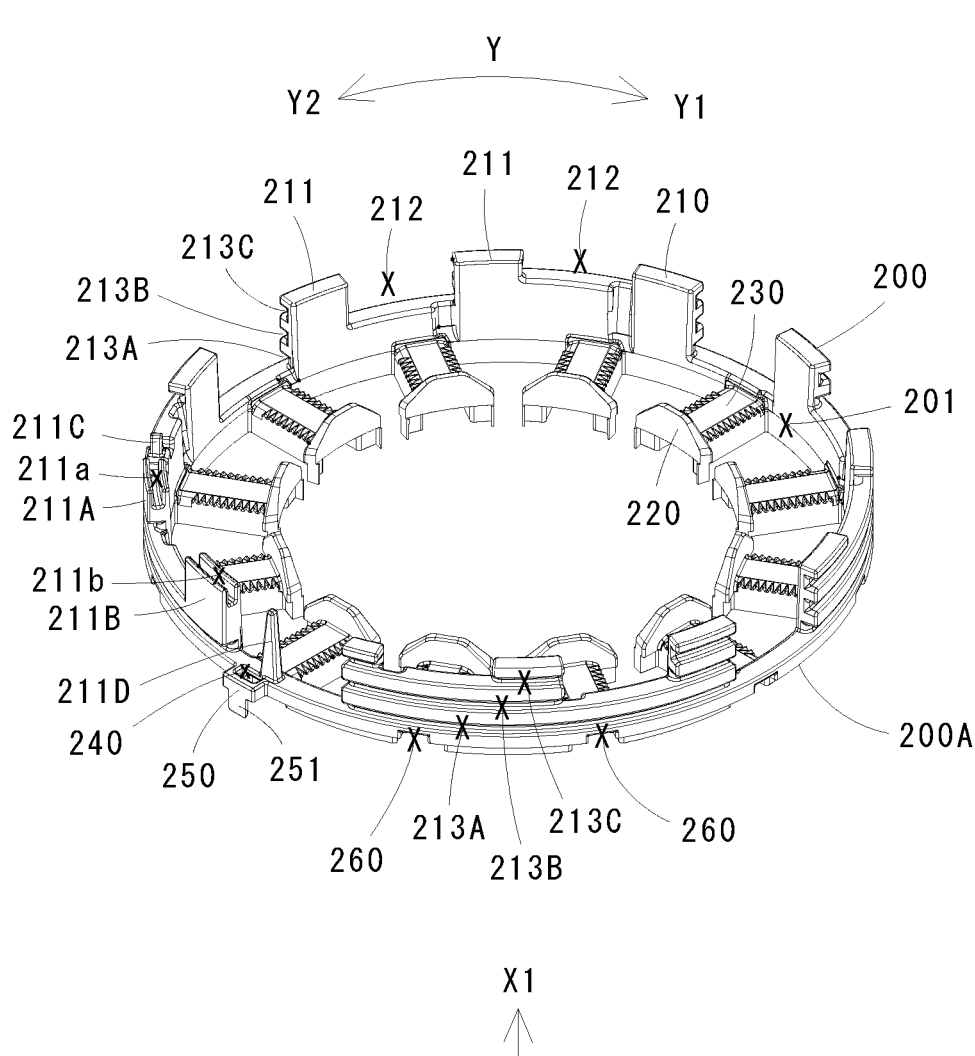
FIG. 4 is a perspective view of a first electrical insulator assembly of the motor of FIG. 3.

As shown in FIG. 4, the first assembly 200 has an outer wall part 210, inner wall parts 220 and body parts 230.

The outer wall part 210 extends in the circumferential direction and the axial direction.

The inner wall parts 220 are arranged radially inward of the outer wall part 210 and are spaced apart from each other in the circumferential direction and extend in the circumferential direction and the axial direction.

The body parts 230 are arranged on the second side (the stator core 100 side) in the axial direction between the outer wall part 210 and the inner wall parts 220 and extend radially.

The outer wall part 210, the inner wall parts 220 and the body parts 230 define a recess 201 that extends in the circumferential direction between the outer wall part 210 and the inner wall parts 220 and is open on the first side (the opposite side to the stator core 100) in the axial direction.

In this embodiment, the first assembly 200 is arranged on the first side of the stator core 100 in the axial direction such that the outer wall part 210, the body parts 230 and the inner wall parts 220 face the yoke 110, the tooth bases 121 and the tooth tips 122 of the stator core 100, respectively.

The outer wall part 210 has notches 212 extending in the circumferential direction. The outer wall part 210 has projections 211 formed between the circumferentially adjacent notches 212 that extend in the circumferential direction and protrude toward the first side in the axial direction (the opposite side to the stator core 100).

Crossover parts 401a, 401b, 401c (described below) of the stator winding 400 are drawn out from the inside to the outside of the outer wall part 210 or drawn back from the outside to the inside of the outer wall part 210 through the notches 212.

Guide grooves 213A, 213B, 213C are formed on an outer peripheral surface of the outer wall part 210 and extend in the circumferential direction. The guide grooves 213A, 213B, 213C are spaced apart from each other in the axial direction. The crossover parts 401a, 410b, 401c drawn out from the inside to the outside of the outer wall part 210 through the notches 212 are arranged along the outer peripheral surface of the outer wall part 210. At this time, the crossover parts 401a, 401b, 401c are respectively guided through any one of the guide grooves 213A, 213B, 213C and are thereby prevented from coming into contact with each other. The guide grooves 213A, 213B, 213C are each separated into parts by the notches 212.

The positions in the circumferential direction, the lengths in the circumferential direction and the depths in the axial direction of the notches 212 (the positions in the circumferential direction and the lengths in the circumferential direction of the projections 211) are set based on positions where the crossover parts 401a, 401b, 401c are drawn out from the inside to the outside of the outer wall part 210 or drawn back from the outside to the inside of the outer wall part 210.

The outer wall part 210 has a first movement restriction part (first movement restricting part, first movement preventing part) and a second movement restriction part (second movement restricting part, second movement preventing part).

The first movement restriction part restricts (prevents, blocks) a neutral point bus bar 410 (described below), which forms a neutral point of the stator winding 400, from moving radially inward and outward and toward the second side (the stator core 100 side) in the axial direction.

The second movement restriction part restricts (prevents, blocks) the neutral point bus bar 410 from moving toward the first and second sides in the circumferential direction.

First, the first movement restriction part will be described.

Figure 3:
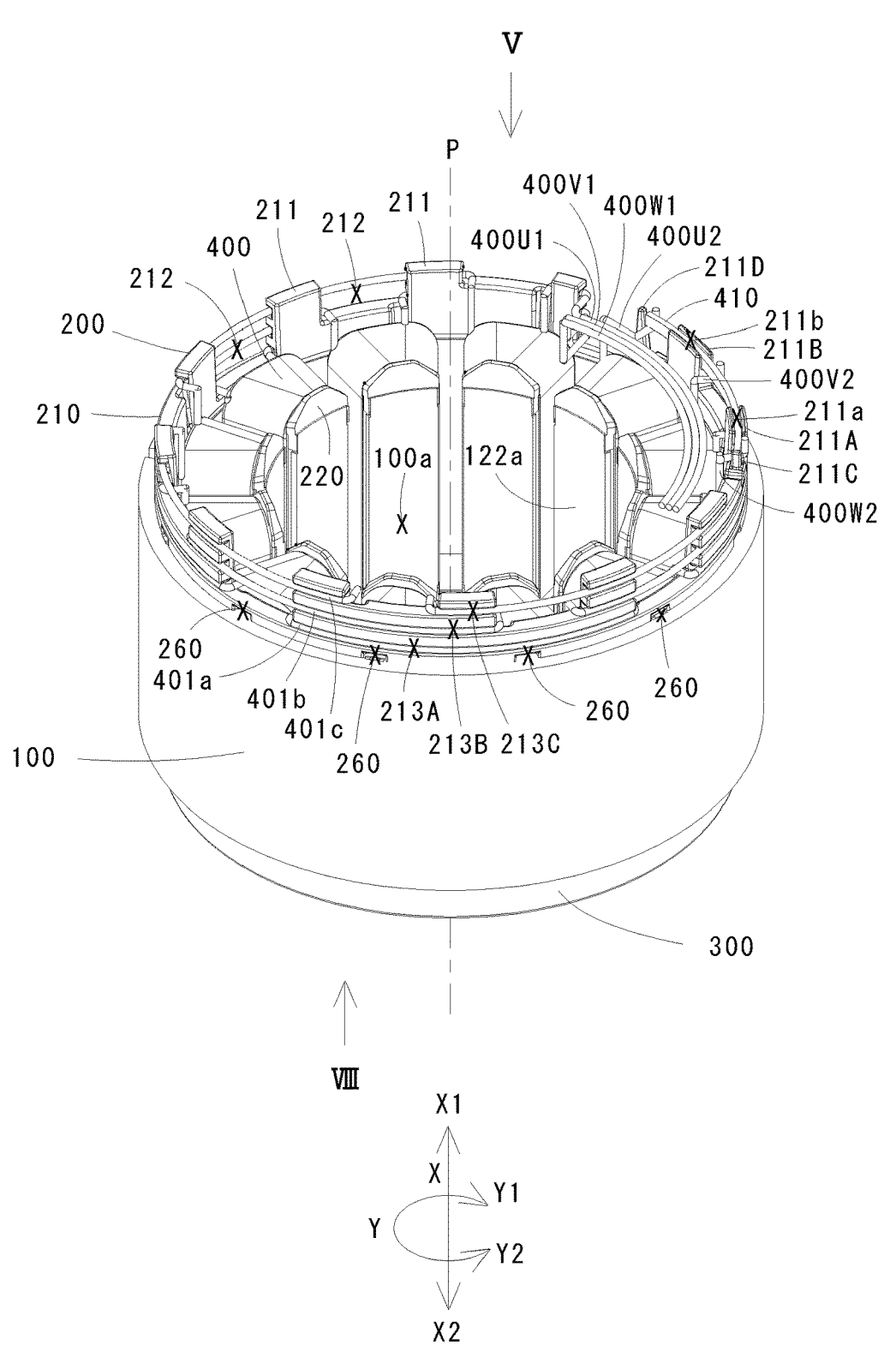
FIG. 3 is a perspective view of a part of a motor of the embodiment of the present disclosure.
Figure 5:
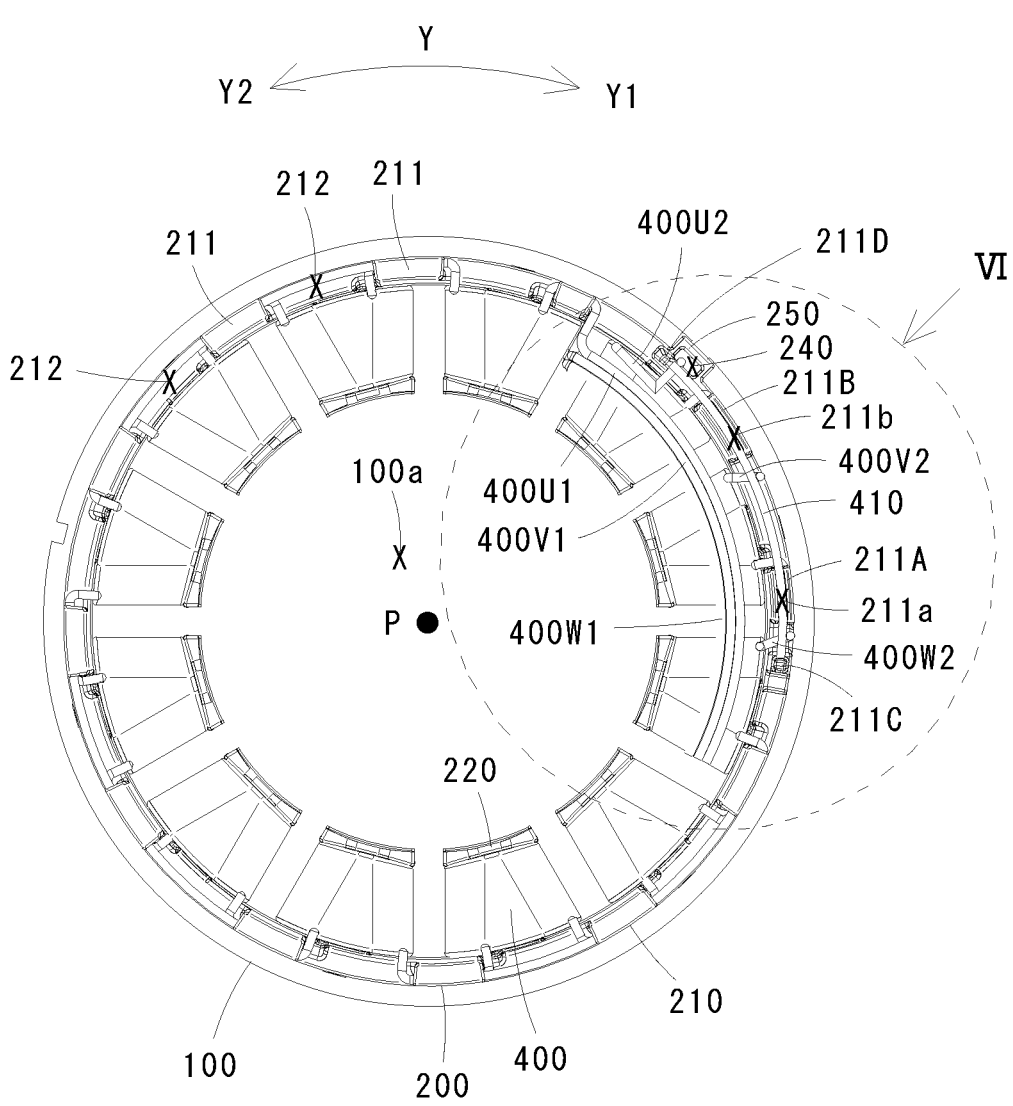
FIG. 5 is a view of the part of the motor of FIG. 3 in the direction of arrow V in FIG. 3.
Figure 6:
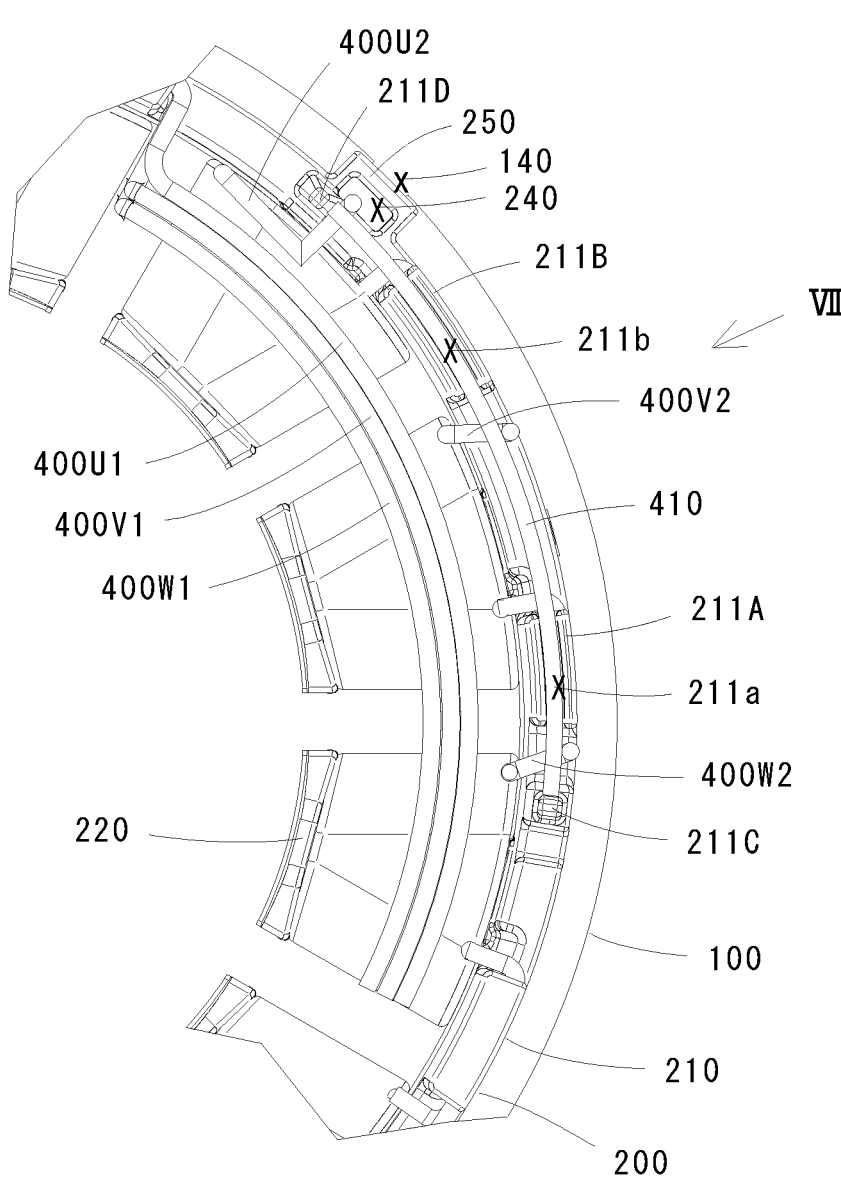
FIG. 6 is an enlarged view of region VI of FIG. 5.

At least one of the projections 211 has a groove extending in the circumferential direction. In this embodiment, as shown in FIGS. 3, 5 and 6, two projections 211A and 211B adjacent in the circumferential direction have respective grooves 211a and 211b.

The groove 211a is formed (defined) at an end surface of the projection 211A on the first side (the opposite side to the stator core 100) in the axial direction and is open on the first side (the opposite side to the stator core 100) in the axial direction and on the first and second sides in the circumferential direction. Specifically, the groove 211a has wall surfaces on the radially inner and outer sides and on the second side in the axial direction.

Similarly, the groove 211b is formed (defined) at an end surface of the projection 211B on the first side in the axial direction and is open on the first side in the axial direction and the first and second sides in the circumferential direction. Specifically, the groove 211b has wall surfaces on the radially inner and outer sides and on the second side in the axial direction.

The grooves 211a, 211b are formed such that the neutral point bus bar 410 can be inserted in the grooves 211a, 211b, of two adjacent projections 211A, 211B while spanning (straddling) the notch 212 between the projections 211A, 211B.

The wall surfaces of the grooves 211a, 211b restrict (prevent, block) the neutral point bus bar 410 inserted in the grooves 211*a*, 211*b* from moving radially inward and outward and toward the second side in the axial direction.

In this embodiment, the projections 211A, 211B are examples of an "at least one projection" according to this disclosure. The grooves 211*a*, 211*b* respectively formed (defined) in the projections 211A, 211B correspond to a "first movement restriction part that is configured to restrict the neutral point part from moving radially inward and outward and toward the stator core side in the axial direction" according to this disclosure.

Next, the second movement restriction part will be described.

In this embodiment, the projections 211 other than the projections 211A, 211B having the respective grooves 211*a*, 211*b* are configured to restrict (prevent, block) the neutral point bus bar 410 from moving toward the first and second sides in the circumferential direction.

Specifically, a projection 211C is formed on the first side of the projection 211A in the circumferential direction, which projection 211A is arranged on the first side of the projection 211B in the circumferential direction and is configured to restrict (prevent, block) the neutral point bus bar 410 in the grooves 211*a*, 211*b* from moving toward the first side in the circumferential direction.

For example, when the neutral point bus bar 410 is in the grooves 211*a*, 211*b* and moves toward the first side in the circumferential direction, the neutral point bus bar 410 abuts on an abutment part of the projection 211C and thereby is restricted from moving further toward the first side in the circumferential direction.

Furthermore, a projection 211D is formed (defined) on the second side of the projection 211B in the circumferential direction, which projection 211B is arranged on the second side of the projection 211A in the circumferential direction and is configured to restrict (prevent, block) the neutral point bus bar 410 in the grooves 211*a*, 211*b* from moving toward the second side in the circumferential direction.

For example, when the neutral point bus bar 410 is inserted in the grooves 211*a*, 211*b* and moves toward the second side in the circumferential direction, the neutral point bus bar 410 abuts on an abutment part of the projection 211D and thereby is restricted from further moving toward the second side in the circumferential direction.

In this embodiment, the projection 211C corresponds to a "second movement restriction part that is arranged on the first side of at least one of the projections in the circumferential direction and is configured to restrict (prevent, block) movement of the neutral point part toward the first side in the circumferential direction" according to this disclosure. The projection 211D corresponds to a "second movement restriction part that is arranged on the second side of at least one of the projections in the circumferential direction and is configured to restrict (prevent, block) movement of the neutral point part toward the second side in the circumferential direction" according to this disclosure.

The second electrical insulator assembly 300 (hereinafter simply referred to as a "second assembly 300") is arranged (disposed) on the second side of the stator core 100 in the axial direction such that an end surface 300A of the second assembly 300 faces the stator core end surface 100B.

Like the first assembly 200, the second assembly 300 has an outer wall part 310, inner wall parts 320 and body parts 230 (see FIG. 1).

The outer wall part 310, the inner wall parts 320 and the body parts 330 define a recess 301 that extends in the circumferential direction between the outer wall part 310 and the inner wall parts 320 and is open on the second side (the opposite side to the stator core 100) in the axial direction.

In this embodiment, the crossover parts 401*a*, 401*b*, 401*c* between winding parts are arranged along the outer peripheral surface of the outer wall part 210 of the first assembly 200, as described below.

Therefore, parts correspond respectively to the projections 211, the notches 212 and the guide grooves 213A to 213C formed in the outer wall part 210 of the first assembly 200 can be omitted in the outer wall part 310 of the second assembly 300.

The second assembly 300 may of course have the same shape or configuration as the first assembly 200.

The stator winding 400 includes a U-phase stator winding (coils), a V-phase stator winding (coils) and a W-phase stator winding (coils).

As shown in FIGS. 3, 5 and 6, the U-, V- and W-phase stator windings 400 include winding parts (coils), first lead parts 400U1, 400V1 and 400W1 and second lead parts 400U2, 400V2 and 400W2. Each of the winding parts is formed by a lead wire composed of a conductive material (such as a copper wire) being wound around the respective tooth 120 (specifically, the tooth bases 121) of the stator core 100 in a state in which the first and second assemblies 200, 300 are respectively arranged (disposed) on the first and second sides of the stator core in the axial direction.

Each of the phase stator windings includes stator winding portions connected in series or in parallel.

Each of the stator winding portions has at least one winding part.

Each winding part has a winding start end and a winding finish end.

Winding start part (wire) extends from the winding start end of the winding part.

Winding finish part (wire) extends from the winding finish end of the winding part.

The first lead parts (first lead wires) 400U1, 400V1 and 400W1 of each of the phase stator windings are selected from the winding start parts connected to winding parts that form the U-, V- and W-phase stator windings. The second lead parts (second lead wires) 400U2, 400V2 and 400W2 of each of the phase stator windings are selected from the winding finish parts connected to winding parts that form the U-, V and W-phase stator windings.

The winding start parts and the winding finish parts that are not respectively selected as the first lead parts and the second lead parts are used as the crossover parts (crossover wires) 401*a*, 401*b*, 401*c* (see FIG. 3) that connect and extend between the winding parts.

In this embodiment, the crossover parts 401*a*, 401*b*, 401*c* are drawn out from the inside to the outside of the outer wall part 210 through any of the notches 212 of the outer wall part 210 of the first assembly 200. Then, the crossover parts 401*a*, 401*b*, 401*c* are guided by the guide grooves 213A, 213B, 213C formed on the outer peripheral surface of the outer wall part 210 and arranged along the outer peripheral surface of the outer wall part 210. Subsequently, the crossover parts 401*a*, 410*b*, 401*c* are drawn back from the outside to the inside of the outer wall part 210 through any of the other notches 212.

In this embodiment, the first lead parts 400U1, 400V1 and 400W1 of the U-, V and W-phase stator windings are connected to a power supply. The second lead parts 400U2, 400V2 and 400W2 of the U-, V and W-phase stator windings are connected in common to the neutral point bus bar 410 so that the neutral point bus bar 410 forms (provides, defines) a neutral point. Thus, the U-, V and W-phase stator windings are star-connected.

In this embodiment, the U-phase stator winding, V-phase stator winding and W-phase stator winding correspond to examples of "stator windings of first, second and third phases" according to this disclosure. The first lead parts 400U1, 400V1 and 400W1 correspond to examples of "first lead parts connected to a power supply" according to this disclosure. The second lead parts 400U2, 400V2 and 400W2 correspond to examples of "second lead parts connected in common" according to this disclosure.

The second lead parts 400U2, 400V2 and 400W2 connected in common are routed in the circumferential direction within the recess 201 of the first assembly 200.

The second lead parts 400U2, 400V2 and 400W2, if not restricted from moving, could potentially move and come into contact with any other electrical component. Therefore, the movement of the second lead parts 400U2, 400V2 and 400W2 needs to be restricted.

The structures for restricting (preventing, blocking) movement of the second lead parts 400U2, 400V2 and 400W2 in the motor of this embodiment will be described with reference to FIGS. 3 and 5 to 7.

In this embodiment, the second lead parts 400U2, 400V2 and 400W2 of the respective phases are connected to the neutral point bus bar 410.

The neutral point bus bar 410 is formed (composed) of a conductive material. In this embodiment, the neutral point bus bar 410 is formed (composed) of copper.

The neutral point bus bar 410 is configured to be insertable in the grooves 211*a*, 211*b* formed in the projections 211A, 211B of the first assembly 200, while spanning (straddling) the notch 212 between the projections 211A, 211B. For example, the neutral point bus bar 410 is formed in a plate-like shape extending in an arc so as to be insertable in the grooves 211*a*, 211*b*.

Furthermore, the neutral point bus bar 410 has a length shorter than a distance between the projections 211C and 211D, which together are the second movement restriction part, in the circumferential direction.

The neutral point bus bar 410 can be formed by various methods. For example, it can be formed by pressing (stamping) a round bar or a copper plate, or it can be formed from a wire that is round or square wire or that has another shape.

In this embodiment, the neutral point bus bar 410 to which the second lead parts 400U2, 400V2 and 400W2 are connected in common constitutes a "neutral point part to which the second lead parts of the stator windings of the first to third phases are connected in common" according to this disclosure.

The neutral point bus bar 410 is inserted into the grooves 211*a*, 211*b* formed in the projections 211A, 211B of the outer wall part 210 of the first assembly 200 with the second lead parts 400U2, 400V2 and 400W2 connected to the neutral point bus bar 410.

Alternatively, the second lead parts 400U2, 400V2 and 400W2 may be connected to the neutral point bus bar 410 with the neutral point bus bar 410 inserted into the grooves 211*a*, 211*b*.

A known connecting method is used to connect the second lead parts 400U2, 400V2 and 400W2 to the neutral point bus bar 410.

In this state, the wall surfaces of the groove 211*a*, 211*b* restrict the neutral point bus bar 410 from moving radially inward and outward and toward the second side (the stator core 100 side) in the axial direction. Furthermore, the projection 211C restricts the neutral point bus bar 410 from moving toward the first side in the circumferential direction, and the projection 211D restricts the neutral point bus bar 410 from moving toward the second side in the circumferential direction.

In this embodiment, the grooves 211*a*, 211*b* formed (defined) in the projections 211A, 211B of the outer wall part 210 of the first assembly 200 and the projections 211C, 211D of the outer wall part 210 of the first assembly 200 restrict movement of the neutral point bus bar 410 to which the second lead parts 400U2, 400V2 and 400W2 are connected in common.

Thus, movement of the second lead parts 400U2, 400V2 and 400W2 are easily restricted with a simple structure.

The cover 500 is arranged on the first side (the opposite side to the stator core 100) of the first assembly 200 in the axial direction.

The cover 500 is formed of a material having electrical insulating properties. In this embodiment, the cover 500 is formed of a polymer having electrical insulating properties.

The structure of the cover 500 will now be described with reference to FIGS. 9 to 13.

The cover 500 includes a peripheral (circumferential) wall 510 and a top wall 520.

The peripheral wall 510 extends in the circumferential direction and the axial direction and has a circular inner peripheral surface and a circular outer peripheral surface. The peripheral wall 510 is arranged outside of the outer wall part 210 (the crossover parts 401*a*, 401*b*, 401*c*) of the first assembly 200 in a state in which the crossover parts 401*a*, 401*b*, 401*c* are inserted in the guide grooves 213A, 213B, 213C formed on the outer peripheral surface of the outer wall part 210 of the first assembly 200.

The top wall 520 is connected to an end of the peripheral wall 510 on the first side (the opposite side to the stator core 100) in the axial direction and extends radially and in the circumferential direction. In this embodiment, the top wall 520 extends in a direction orthogonal (or substantially orthogonal) to the axial direction. The top wall 520 has an opening 520*a* in its center. The first lead parts 400U1, 400V1 and 400W1 pass through the opening 520*a* of the top wall 520.

The cover 500 is detachably mounted on the first assembly 200 via mounting mechanisms at a plurality of positions spaced apart from each other in the circumferential direction.

In this embodiment, each of the mounting mechanisms includes a locking piece having a claw and an engagement recess configured to be engaged with the claw of the locking piece. In this embodiment, the locking piece is formed in the peripheral wall 510 of the cover 500, and the engagement recess is formed in the outer wall part 210 of the first assembly 200.

Furthermore, in this embodiment, two different mounting mechanisms (first and second mounting mechanisms) are provided, each including a locking piece with a claw and an engagement recess. An appropriate one of the mounting mechanisms is selectively used according to the mounting position.

First, the first mounting mechanism will be described.

Figure 11:
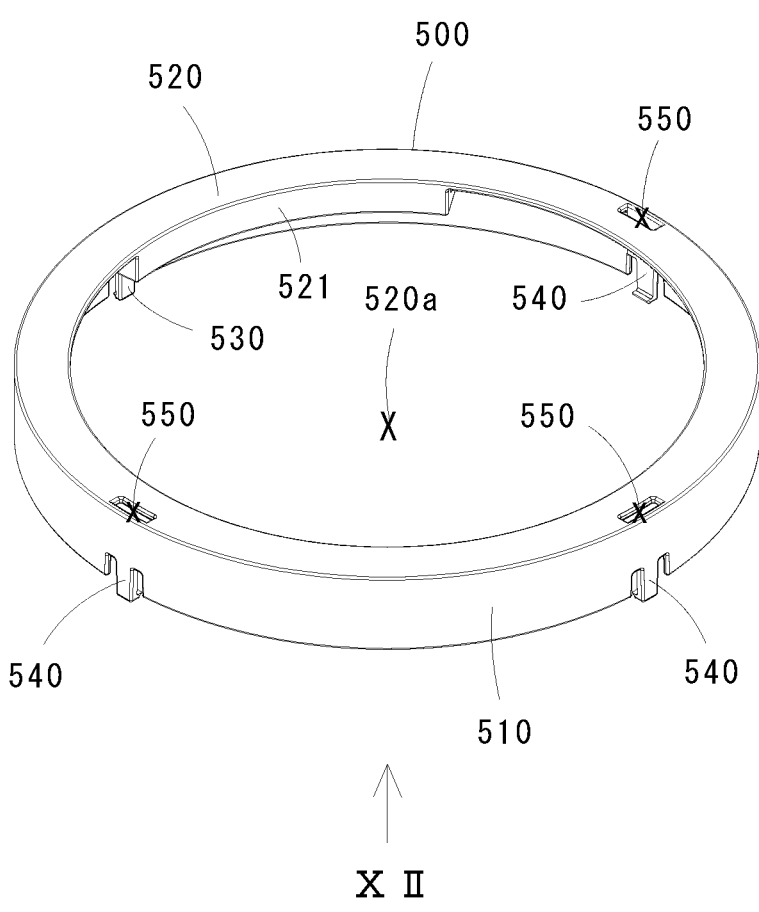
FIG. 11 is a perspective view of a first embodiment of a cover that may be used in the motor of the embodiment.
Figure 13:
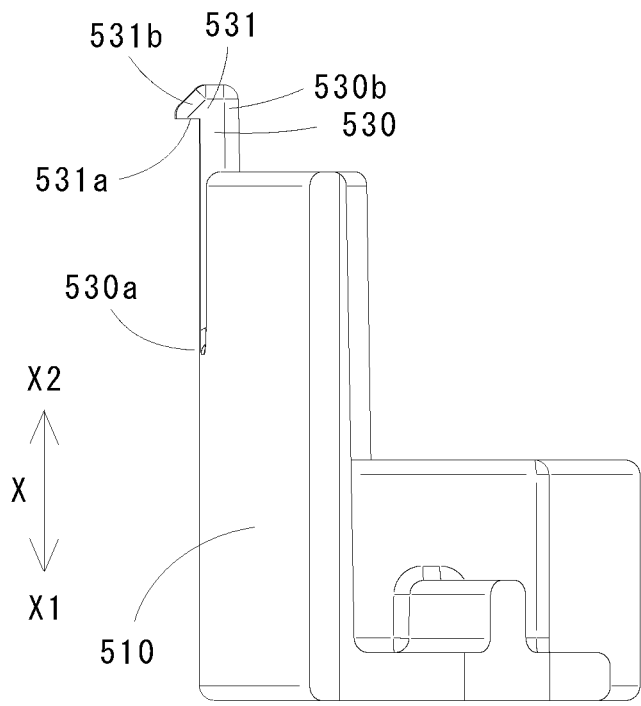
FIG. 13 is a sectional view of the cover of FIG. 12 in the direction of line XIII-XIII in FIG. 12.
Figure 15:
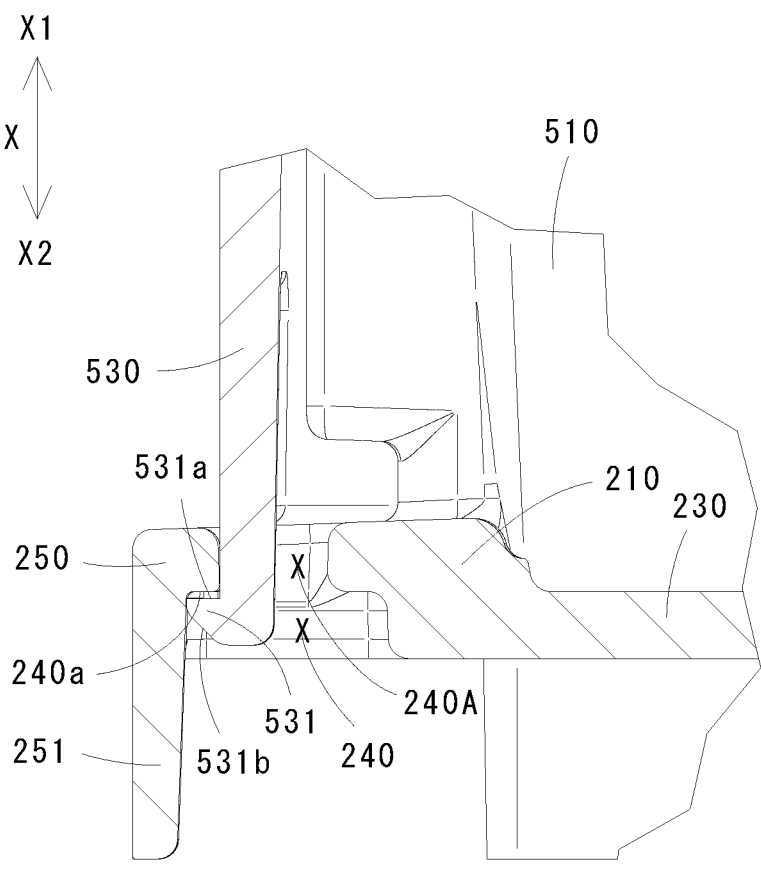
FIG. 15 is a sectional view of the cover taken along line XV-XV in FIG. 10.

As shown in FIGS. 11, 13 and 15, the first mounting mechanism includes a locking piece 530 formed on the peripheral wall 510 of the cover 500, and an engagement recess 240 formed in the outer wall part 210 of the first assembly 200.

The locking piece 530 extends in the axial direction. The locking piece 530 has an end part 530*a* on the first side (the opposite side to the stator core 100) in the axial direction that is a fixed end fixed to the peripheral wall 510 and an end part 530*b* on the second side (the stator core 100 side) in the axial direction that is a free end. The locking piece 530 is configured such that the end part (free end) 530*b* on the second side in the axial direction can be elastically deformed in a radial direction relative to the end part (fixed end) 530*a* on the first side in the axial direction.

The locking piece 530 has a claw 531 on the end part 530*b* on the second side (the stator core 100 side) in the axial direction. In this embodiment, as shown in FIGS. 13 and 15, the claw 531 protrudes radially outward.

The claw 531 has a locking surface (engagement surface) 531*a* and an inclined (cam) surface 531*b*. The inclined surface 531*b* is inclined radially outward to the first side in the axial direction from an end on the second side in the axial direction. The locking surface 531*a* extends radially inward from an end of the inclined surface 531*b* on the first side in the axial direction. In this embodiment, the locking surface 531*a* extends in a direction orthogonal (or substantially orthogonal) to the axial direction.

As shown in FIGS. 4 and 6, a projection 250 is formed (provided, defined) at a position on an end part of the outer wall part 210 of the first assembly 200 on the second side in the axial direction where the engagement recess 240 is formed. The projection 250 protrudes radially outward. The engagement recess 240 is formed in the projection 250.

As shown in FIG. 15, the engagement recess 240 has an insertion opening 240A formed on the first side in the axial direction through which the claw 531 of the locking piece 530 is insertable. In the engagement recess 240, a locking surface (engaged surface) 240*a* extending radially outward from an end of the insertion opening 240A on the second side in the axial direction is formed. The locking surface 240*a* is configured to be engaged by (with) the locking surface 531*a* of the claw 531 of the locking piece 530. In this embodiment, the locking surface 240*a* extends in a direction orthogonal (or substantially orthogonal) to the axial direction.

In this embodiment, the locking piece 530 and the claw 531 correspond to a "first locking piece" and a "first claw" according to this disclosure, respectively. The engagement recess 240 and the locking surface 240*a* correspond to a "first engagement recess" and a "first locking surface" according to this disclosure, respectively.

Next, the second mounting mechanism will be described.

Figure 12:
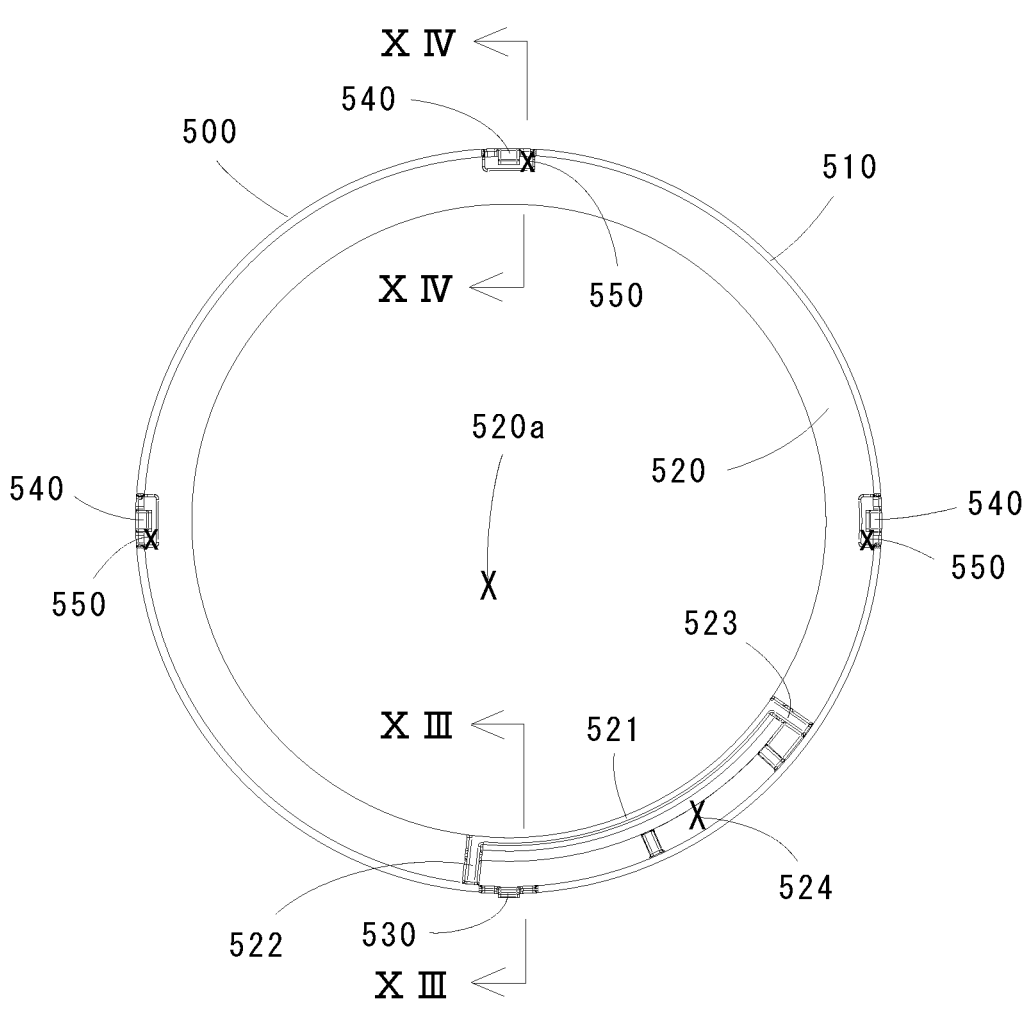
FIG. 12 is a view of the cover of FIG. 11 in the direction of arrow XII in FIG. 11.
Figure 14:
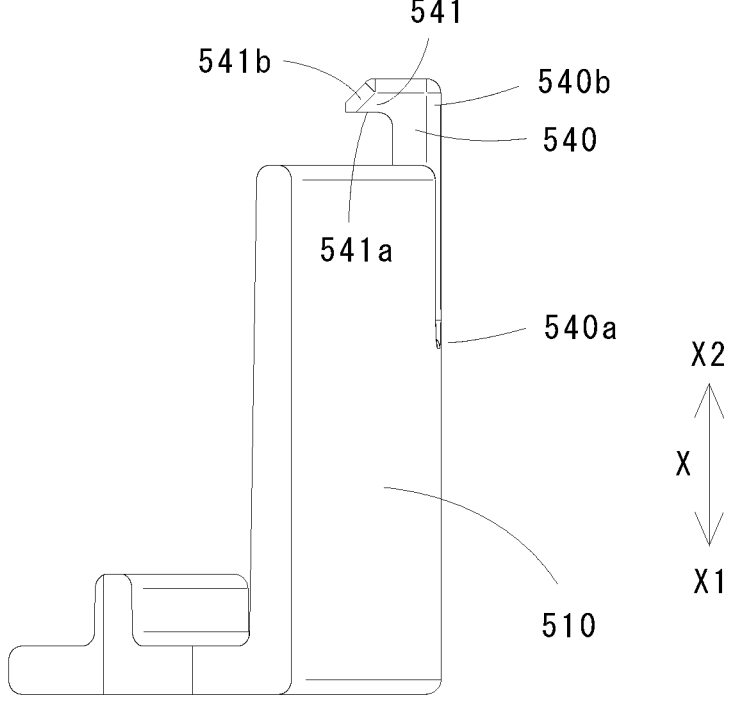
FIG. 14 is a sectional view of the cover taken along line XIV-XIV in FIG. 12.
Figure 16:
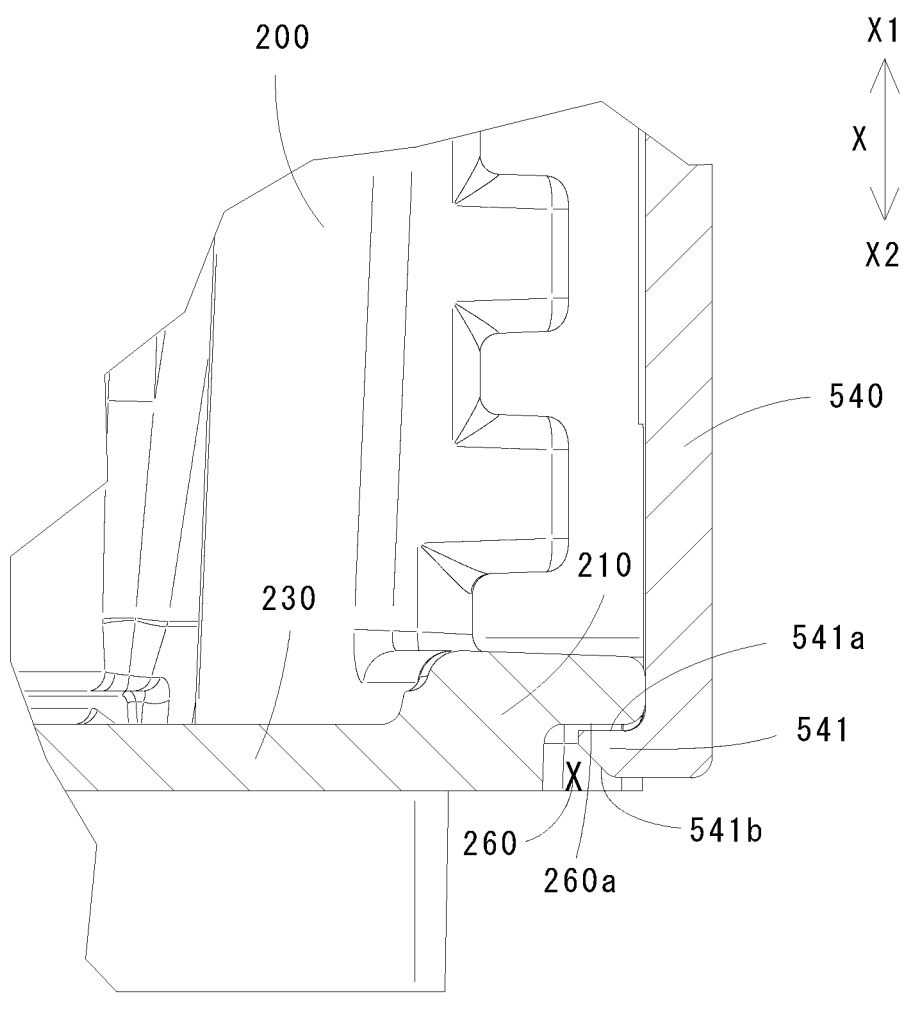
FIG. 16 is a sectional view of the cover taken along line XVI-XVI in FIG. 10.

As shown in FIGS. 12, 14 and 16, the second mounting mechanism includes a locking piece 540 formed on the peripheral wall 510 of the cover 500 and an engagement recess 260 formed on the outer wall part 210 of the first assembly 200.

The locking piece 540 extends in the axial direction. The locking piece 540 has an end part 540*a* on the first side (the opposite side to the stator core 100) in the axial direction that is a fixed end fixed to the peripheral wall 510 and an end part 540*b* on the second side (the stator core 100 side) in the axial direction that is a free end. The locking piece 540 is configured such that the end part (free end) 540*b* on the second side in the axial direction can be elastically radially deformed relative to the end part (fixed end) 540*a* on the first side in the axial direction.

The locking piece 540 has a claw 541 on the end part 540*b* on the second side (the stator core 100 side) in the axial direction. In this embodiment, as shown in FIGS. 14 and 16, the claw 541 protrudes radially inward.

The claw 541 has a locking surface (engagement surface) 541*a* and an inclined (cam) surface 541*b*. The inclined surface 541*b* is inclined radially inward toward the first side in the axial direction from an end on the second side in the axial direction. The locking surface 541*a* extends radially outward from an end of the inclined surface 541*b* on the first side in the axial direction. In this embodiment, the locking surface 541*a* extends in a direction orthogonal (or substantially orthogonal) to the axial direction.

The engagement recess 260 is formed at (on, in) an end part of the outer peripheral surface of the outer wall part 210 of the first assembly 200 on the second side in the axial direction and is open on the radially outer side and on the second side in the axial direction. The engagement recess 260 has a locking surface (engaged surface) 260*a* that extends radially on the first side in the axial direction and is configured to be engageable with the locking surface 541*a* of the claw 541 of the locking piece 540. In this embodiment, the locking surface 260*a* extends in a direction orthogonal (or at least substantially orthogonal) to the axial direction.

In this embodiment, the locking piece 540 and the claw 541 correspond to a "second locking piece" and a "second claw" according to this disclosure, respectively. The engagement recess 260 and the locking surface 260*a* correspond to a "second engagement recess" and a "second locking surface" according to this disclosure, respectively.

Figure 7:
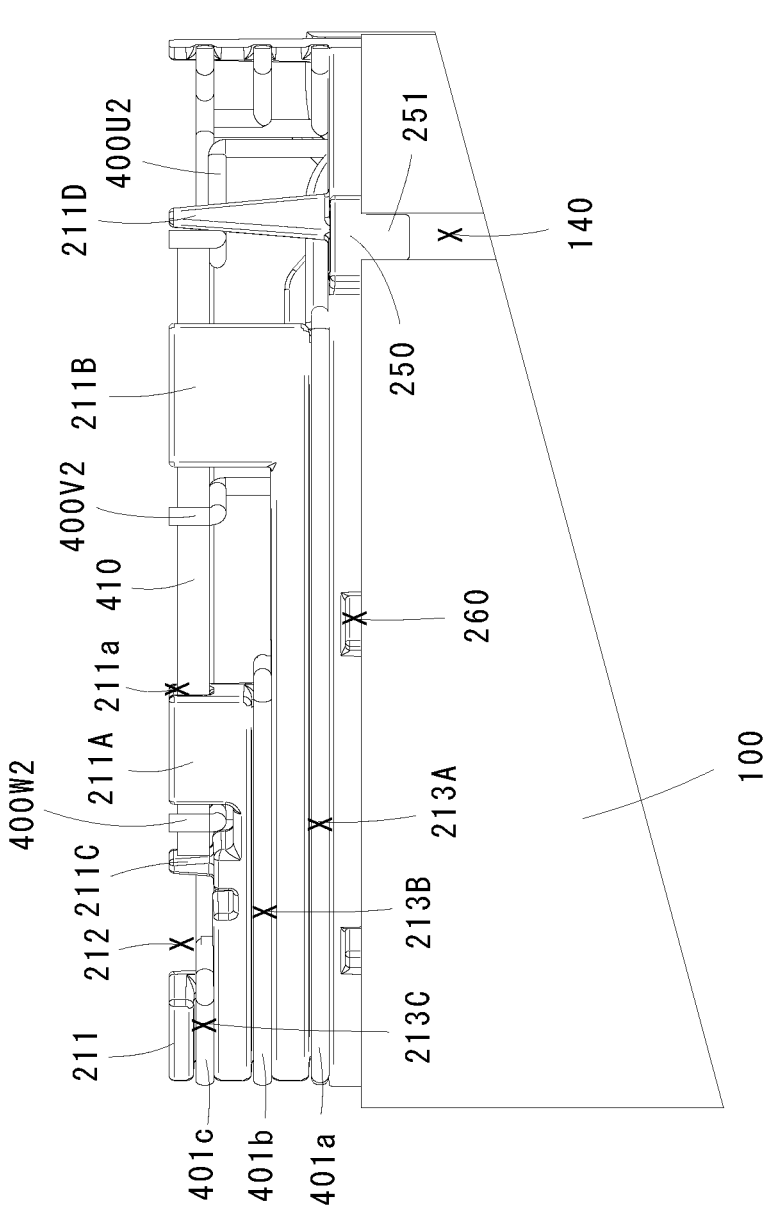
FIG. 7 is a view of the part of the motor shown in FIG. 6 in the direction of arrow VII in FIG. 6.
Figure 8:
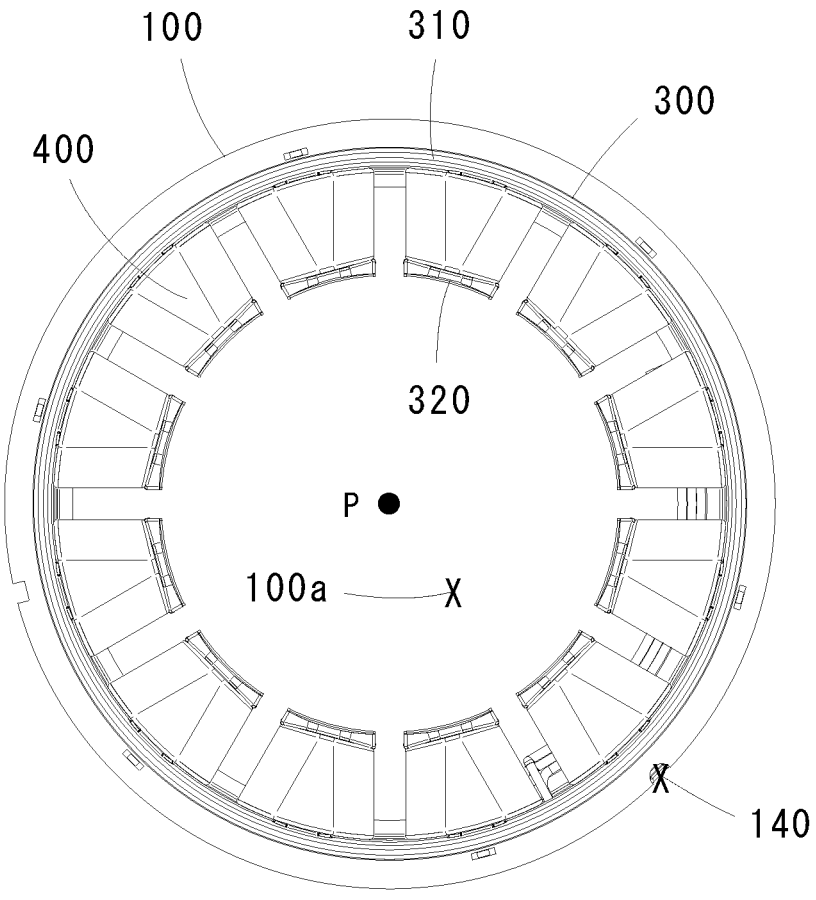
FIG. 8 is a view of the part of the motor of FIG. 3 in the direction of arrow VIII in FIG. 3.
Figure 9:
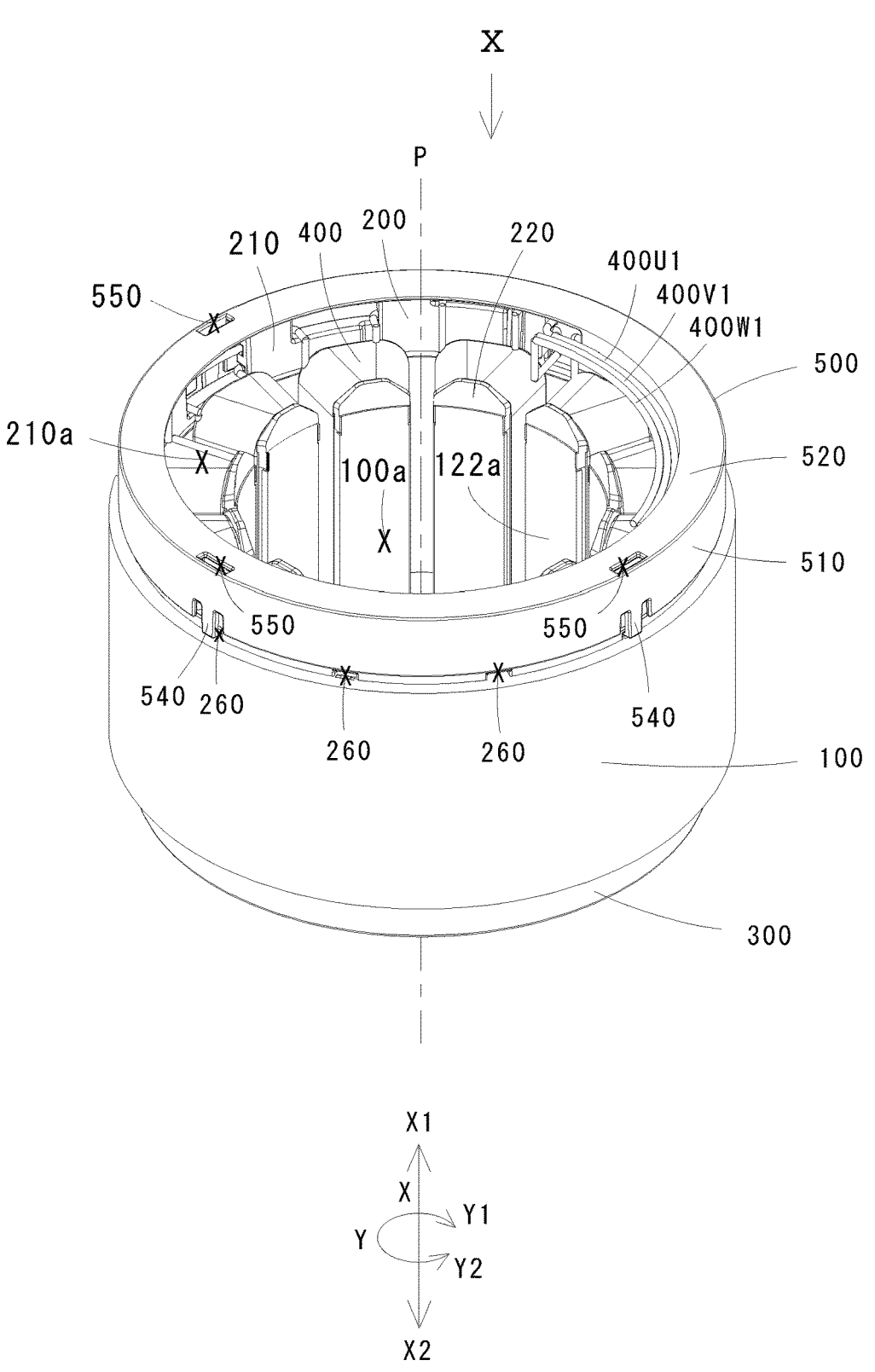
FIG. 9 is a perspective view of the motor of the embodiment of the present disclosure including a cover.
Figure 10:
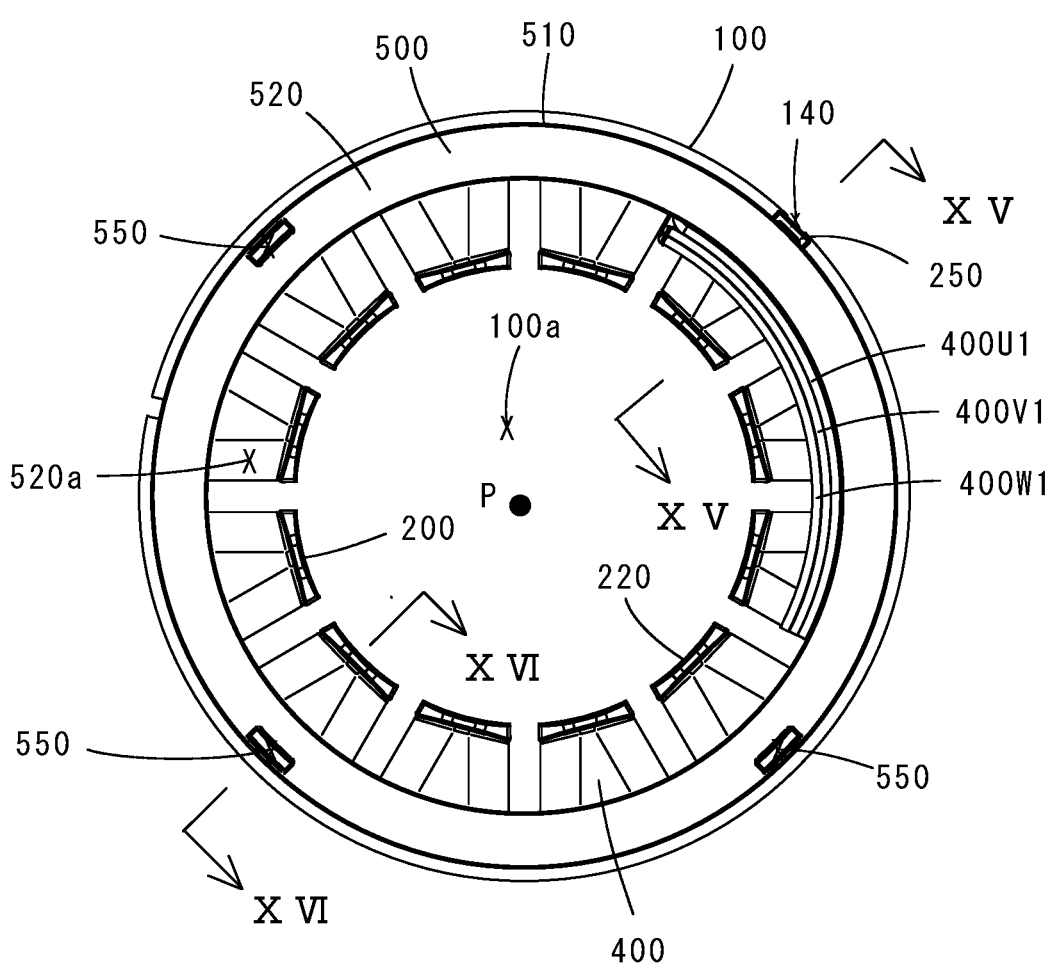
FIG. 10 is a view of the motor of FIG. 9 as viewed in the direction of arrow X in FIG. 9.

As shown in FIGS. 4 and 7, the projection 250 of the first assembly 200 has a positioning projection 251 protruding toward the second side in the axial direction. The positioning projection 251 extends in the axial direction.

Furthermore, a positioning recess 140 is formed on the outer peripheral surface 102 of the stator core 100. The positioning recess 140 extends in the axial direction and opens on the first side in the axial direction such that the positioning projection 251 is insertable therein. In this embodiment, the positioning recess 140 has an opening to the end surface 100A of the stator core 100 on the first side in the axial direction.

When arranging the first assembly 200 on the first side of the stator core 100 in the axial direction, the positioning projection 251 formed on the projection 250 of the first assembly 200 is inserted into the positioning recess 140 formed in the stator core outer peripheral surface 102 of the stator core 100. Thus, the first assembly 200 can be easily positioned on the stator core 100.

In this embodiment, the positioning projection 251 and the positioning recess 140 constitute a positioning mechanism.

The positioning projection 251 is formed on the projection 250 that protrudes radially outward on the outer wall part 210 of the first assembly 200, and the positioning recess 140 is formed on the outer peripheral surface of the stator core 100. With this arrangement, the positioning projection 251 can be easily positioned in the positioning recess 140, and the first assembly 200 can be easily assembled on the stator core 100.

A plurality of positioning mechanisms may be provided. Furthermore, the positioning mechanism is not limited to a positioning mechanism that includes the positioning projection 251 and the positioning recess 140.

In this embodiment, the cover 500 is mounted on the first assembly 200 via the mounting mechanisms at four positions (points) in the circumferential direction. In this embodiment, the first mounting mechanism (the locking piece 530, the engagement recess 240) is provided at one of the four positions, and the second mounting mechanism (the locking piece 540, the engagement recess 260) is provided at each of the other three positions.

When mounting the cover 500 on the first assembly 200, the cover 500 is placed on the first side of the first assembly 200 in the axial direction such that each locking piece (530, 540) formed in the peripheral wall 510 of the cover 500 faces a corresponding engagement recess (240, 260) formed in the outer wall part 210 of the first assembly 200. Then, the cover 500 is moved toward the second side (the stator core 100 side) in the axial direction.

When the cover 500 is moved toward the second side in the axial direction, the claw 531 of the locking piece 530 abuts on a wall surface of the insertion opening 240A of the engagement recess 240 and thereby the locking piece 530 is elastically deformed radially inward. In this state, when the cover 500 is further moved until the claw 531 of the locking piece 530 passes through the insertion opening 240A, the abutment of the claw 531 of the locking piece 530 on the wall surface of the insertion opening 240A is released and thereby the locking piece 530 elastically returns outward in the radial direction. Thus, the locking surface 531a of the claw 531 of the locking piece 530 is engaged with the locking surface 240a of the engagement recess 240. The inclined surface 531b provided on the claw 531 facilitates radially inward deformation of the locking piece 530.

Furthermore, the claw 541 of the locking piece 540 abuts on the outer peripheral surface of the outer wall part 210 and thereby the locking piece 540 is elastically deformed radially outward. In this state, when the cover 500 is further moved until the claw 541 of the locking piece 540 is moved to a position corresponding to the engagement recess 260, the abutment of the claw 541 of the locking piece 540 on the outer peripheral surface of the outer wall part 210 is released, and the locking piece 540 elastically returns radially inward. Thus, the locking surface 541a of the claw 541 of the locking piece 540 is engaged with the locking surface 260a of the engagement recess 260. The inclined surface 541b of the claw 541 facilitates radially outward deformation of the locking piece 540.

In an embodiment in which the second mounting mechanism (the locking piece 540, the engagement recess 260) is used as the mounting mechanism(s) for mounting the cover 500 on the first assembly 200 and the cover 500 is formed (composed) of an electrically insulating polymer, as shown in FIGS. 9 to 12, openings 550 through the top wall 520 of the cover 500 in the axial direction are formed (provided, defined) at positions of the top wall 520, each of which corresponds to a respective one of the locking pieces 540.

Recently, along with an increase in vehicle power supply voltage, a motor designed for high voltage operation is also required to be used as the motor for the electric compressor of a vehicle.

In a motor designed for low voltage operation, an insulation distance between the stator winding(s) 400 arranged inside the first assembly 200 and an electrical component arranged outside of the outer wall part 210 of the first assembly 200 is adequate even if the openings 550 are formed in the top wall 520 of the cover 500. However, in a motor designed for high voltage operation, the insulation distance may be reduced due to the presence of the openings 550 of the cover 500.

In an embodiment in which the first mounting mechanism (the locking piece 530, the engagement recess 240) as the mounting mechanism(s) for mounting the cover 500 on the first assembly 200 and the cover 500 is formed (composed) of an electrically insulating polymer, unlike in the case of using the second mounting mechanism, an opening 550 is not formed at a position of the top wall 520 of the cover 500 corresponding to the locking piece 530. That is, the position of the top wall 520 of the cover 500 corresponding to the locking piece 530 is imperforate.

In the motor of this embodiment, either the first mounting mechanism or the second mounting mechanism is selectively used according to the mounting position at which the cover 500 is mounted to the first assembly 200.

For example, at one of the four mounting positions in the circumferential direction, the first mounting mechanism (the locking piece 530, the engagement recess 240) is used to mount the cover 500 to the first assembly 200, and at each of the other three mounting positions, the second mounting mechanism (the locking piece 540, the engagement recess 260) is used to mount the cover 500 to the first assembly 200.

In this case, at the position where the cover 500 is mounted to (on) the first assembly 200 by using the first mounting mechanism (the locking piece 530, the engagement recess 240), an opening through the top wall is not formed at a position of the top wall 520 corresponding to the locking piece 530.

By using the first mounting mechanism, a reduction of the electrical insulation distance, which would otherwise be caused by the presence of the opening formed in the top wall 520 of the cover 500, is avoided. For example, when an electrical component is arranged outside of the outer wall part 210 of the first assembly 200 in the vicinity of an arrangement position of the electrical component, the first mounting mechanism is used as the mounting mechanism for mounting the cover 500 to (on) the first assembly 200.

In this embodiment, the positions where the locking pieces 530, 540 are formed correspond to examples of "first positions" according to this disclosure. The position where the locking piece 530 is formed corresponds to an example of "at least one of the first positions" according to this disclosure. The positions where the locking pieces 540 are formed correspond to examples of "first positions other than the at least one of the first positions" according to this disclosure.

The positions where the engagement recesses 240, 260 are formed correspond to examples of "second positions corresponding to the first positions" according to this disclosure. The position where the engagement recesses 240 is formed corresponds to an example of "at least one of the second positions corresponding to the at least one of the first positions" according to this disclosure. The positions where the engagement recesses 260 are formed correspond to examples of "second positions other than the at least one of the second position" according to this disclosure.

Further, the second lead parts 400U2, 400V2 and 400W2 mounted to (on) the outer wall part 210 of the first assembly 200 may come into contact with the winding parts and the first lead parts 400U1, 400V1 and 400W1.

In this embodiment, as shown in FIG. 12, first, second and third wall parts 521, 522, 523 are formed (provided, defined) on the second side (the stator core 100 side) of the top wall 520 of the cover 500 in the axial direction. The first wall part 521 is formed radially inward of the peripheral wall 510 and extends in the circumferential direction and the axial direction. The second and third wall parts 522, 523 extend radially and in the axial direction between ends of the first wall part 521 on the first and second sides in the circumferential direction and the peripheral wall 510. The first, second and third wall parts 521, 522, 523 and the peripheral wall 510 define a recess 524 extending in the circumferential direction and the axial direction and are open on the second side in the axial direction. The first, second and third wall parts 521, 522, 523 are configured such that the neutral point bus bar 410 and the projections 211C, 211D are located within the recess 524 when the cover 500 has been mounted on the first assembly 200.

This arrangement increases the electrical insulation distance from the neutral point bus bar 410 to the winding parts and the first lead parts 400U1, 400V1 and 400W1.

In this embodiment, the first mounting mechanism is used (provided) at only one of the four mounting positions; however, the first mounting mechanism may be used (provided) at more than one of the four mounting positions.

Figure 17:
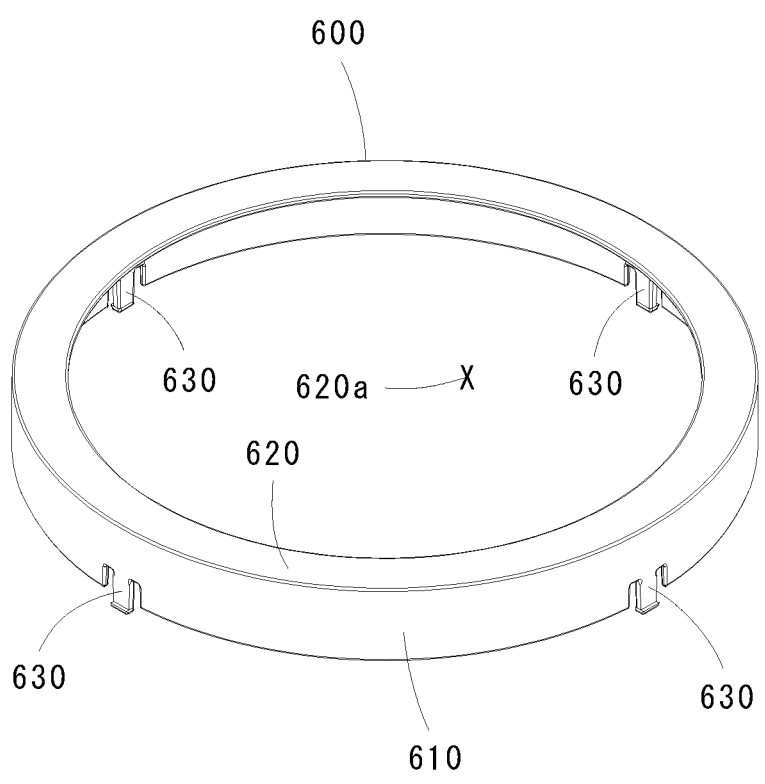
FIG. 17 is a perspective view of a cover of a second embodiment.

FIG. 17 shows a cover 600 of a second embodiment in which a first mounting mechanism is used (provided) at every mounting position.

The cover 600 has a peripheral wall 610 and a top wall 620.

A locking piece 630 that constitutes the first mounting mechanism is formed (provided, defined) at each of four positions in the circumferential direction on the peripheral wall 610.

A projection protruding radially outward is formed (provided, defined) at each of four second positions of the outer wall part 210 of the first assembly 200 that correspond to the first positions where the locking pieces 630 are formed. An engagement recess 240 that constitutes the first mounting mechanism is formed in each of the projections.

The motor described in this embodiment can be modified as follows.

In this embodiment, although the first mounting mechanism used as the mounting mechanism for mounting the cover 500 on the first assembly 200 includes a locking finger formed on the cover 500 (the locking piece 530 having the claw 531 protruding radially outward) and a locking surface formed in the outer wall part 210 of the first assembly 200 (the engagement recess 240 formed in the projection 250 of the outer wall part 210), various mounting mechanisms in which no recess is formed in the cover 500 may instead be used. For example, a mounting mechanism for mounting by welding may be used.

The structure of the cover 500 is not limited to the structure described in the embodiment. Although the cover 500 is mounted on the first assembly 200 in the above-described embodiment, it may instead be mounted on the second assembly 300. In this case, the crossover parts 401*a*, 401*b*, 401*c* of the phase stator windings are arranged on the second assembly 300 side.

In addition, although the first and second movement restriction parts are formed on the first assembly 200, they may instead be formed on the second assembly 300. In this case, the crossover parts 401*a*, 401*b*, 401*c* and the second lead parts 400U2, 400V2 and 400W2 of the respective phases are arranged on the second assembly 300 side.

Two second movement restriction parts are provided in the above-described embodiment, one of which restricts the movement of the second lead parts 400U2, 400V2 and 400W2 toward the first side in the circumferential direction and the other restricts the movement toward the second side in the circumferential direction. However, only one second movement restriction part that restricts the movement to one of the first and second sides in the circumferential direction may instead be provided.

The projection having an abutment part on which the neutral point bus bar 410 abuts is used as the second movement restriction part, but the second movement restriction part is not limited to a projection. In other words, the second movement restriction part may be configured to only restrict movement of the neutral point bus bar toward at least one of the first and second sides in the circumferential direction.

The first movement restriction part includes the two grooves (211*a*, 211*b*), but it may instead include at least one groove.

Although the grooves (211*a*, 211*b*) are used as the first movement restriction part in the above-described embodiment, the first movement restriction part is not limited to the grooves. In other words, the first movement restriction part may be configured to only restrict the neutral point bus bar from moving radially inward and radially outward and toward the stator core side in the axial direction.

The grooves (211*a*, 211*b*) that are open on the first and second sides in the circumferential direction are used as the first movement restriction part in the above-described embodiment. However, but a groove that is open on one of the first and second sides in the circumferential direction or a groove that is closed on at least one of the first and second sides in the circumferential direction may instead be used as the first movement restriction part.

The first and second movement restriction parts are provided to restrict movement of the second lead parts 400U2, 400V2 and 400W2, but the method of restricting movement of the neutral point part is not limited to this. For example, the neutral point part may be bound (affixed) to the outer wall part 210 of the first assembly 200 with a string.

Furthermore, the first and second movement restriction parts may be omitted.

The neutral point part to which the second lead parts 400U2, 400V2 and 400W2 of the respective phase-stator windings are connected in common includes the neutral point bus bar 410 in the above-described embodiment. However, the structure of the neutral point part is not limited to this. For example, the neutral point part may instead be one of the second lead parts to which the other two second lead parts are connected.

Although the recess 524 of the cover 500 is defined by the first, second and third wall parts 521, 522, 523 and the peripheral wall 510 in the above-described embodiment, the method of defining the recess 524 is not limited to this. For example, the recess 524 may be defined by one wall part.

Furthermore, the recess 524 of the cover 500 may be omitted.

The structure and arrangement of the neutral point part are not limited to those described in this embodiment.

The phase stator windings are described as being star-connected, but the connection of the phase stator windings is not limited to a star connection.

The present disclosure can be provided with the following features.

(Aspect 1) A motor, comprising a rotor and a stator, wherein:

the stator includes a tubular stator core extending in an axial direction, first and second electrical insulator assemblies that are respectively arranged on a first and second sides of the stator core in the axial direction, a stator winding and a cover;

the stator core includes a yoke extending in a circumferential direction around an axis of the stator core, and teeth each extending radially inward from the yoke;

each of the first and second electrical insulator assemblies includes an outer wall part that extends in the circumferential direction and the axial direction, inner wall parts each of which is arranged radially inward of the outer wall part and extends in the circumferential direction and the axial direction, and body parts each of which is arranged on the stator core side in the axial direction between the outer wall part and each of the inner wall parts and extends radially;

the stator winding includes winding parts, each wound around the tooth of the stator core;

the cover includes a peripheral wall and a top wall, the peripheral wall being arranged radially outside of the outer wall part of the first electrical insulator assembly and extending in the circumferential direction and the axial direction, the top wall being connected to an end of the peripheral wall on the first side in the axial direction and extending radially and in the circumferential direction and being arranged on the first side of the outer wall part of the first electrical insulator assembly in the axial direction;

the peripheral wall of the cover includes locking fingers each of which is formed at each of first positions that are spaced apart from each other in the circumferential direction;

the outer wall part of the first electrical insulator assembly includes locking surfaces each of which is formed at each of second positions that are spaced apart from each other in the circumferential direction and correspond to the first positions, each of the locking surfaces being configured to be engageable with the locking finger formed at the corresponding first position; and at a position of the top wall of the cover that corresponds to at least one of the first positions, an opening that passes through the top wall in the axial direction is not formed.

(Aspect 2) The motor as defined in Aspect 1, wherein:

at the at least one of the first positions of the peripheral wall of the cover, a first locking piece that has a first claw protruding radially outward; and at a position of at least one of the second positions of the outer wall part of the first electrical insulator assembly that corresponds to the at least one of the first positions a projection that protrudes radially outward is formed, and a first engagement recess that is configured to be engageable with the first claw of the first locking piece is formed in the projection.

(Aspect 3) The motor as defined in Aspect 2, wherein the first locking piece extends in the axial direction and is configured such that an end part of the first locking piece on the second side in the axial direction is elastically radially deformable relative to an end part of the first locking piece on the first side in the axial direction, and the first claw is formed at the end part of the first locking piece on the second side in the axial direction.

(Aspect 4) The motor as defined in Aspects 2 or 3, wherein the first engagement recess has an insertion opening into which the first claw can be inserted, and a first locking surface that is configured to be engageable with the first claw is formed extending from an end of the insertion opening on the second side in the axial direction.

(Aspect 5) The motor as defined in any one of Aspects 2 to 4, wherein:

at each of the first positions other than the at least one of the first positions of the peripheral wall of the cover, a second locking piece that has a second claw protruding radially inward is formed; and at each of the second positions other than the at least one of the second positions of the outer wall of the first electrical insulator assembly that corresponds to the at least one of the first positions, a second engagement recess that has a second locking surface configured to be engageable with the second claw of the second locking piece is formed.

(Aspect 6) The motor as defined in any one of Aspects 2 to 5, wherein:

the projection formed on the outer wall part of the first electrical insulator assembly has a positioning projection that protrudes to the second side in the axial direction; and an outer peripheral surface of the stator core has a positioning recess that extends in the axial direction and is open on the first side in the axial direction and is configured such that the positioning projection can be inserted therein.

(Aspect 7) The motor as defined in any one of Aspects 1 to 6, wherein:

the stator winding includes first, second and third phase stator windings, each of which includes winding parts each wound around a tooth of the stator core, a first lead part that is connected to a power supply, and a second lead part that is connected in common;

the stator includes a neutral point bus bar to which the second lead parts of the first, second and third phase stator windings are connected in common;

the cover includes at least one wall part protruding to the second side in the axial direction from the top wall, the at least one wall part defining a recess extending in the circumferential direction and the axial direction and open on the second side in the axial direction; and the neutral point bus bar is mounted to the outer wall part of the first electrical insulator assembly and located within the recess of the cover.

(Aspect 8) The motor as defined in any one of Aspects 1 to 6, wherein:

the stator winding includes first, second and third phase stator windings each of which includes winding parts each wound around a tooth of the stator core, a first lead part that is connected to a power supply, and a second lead part that is connected in common;

the stator winding includes a neutral point part to which the second lead parts of the first, second and third phase stator windings are connected in common; and the outer wall part of the first electrical insulator assembly includes a first movement restriction part that restricts movement of the neutral point part.

(Aspect 9) The motor as defined in Aspect 8, wherein the first movement restriction part is configured to restrict the neutral point part from moving radially inward and radially outward and to the second side in the axial direction.

(Aspect 10) The motor as defined in Aspect 8 or 9, wherein:

the outer wall part of the first electrical insulator assembly includes projections protruding to the first side in the axial direction at positions spaced apart from each other in the circumferential direction;

at least one of the projections has a groove extending in the circumferential direction and open on the first side in the axial direction and configured such that the neutral point part can be inserted therein; and the first movement restriction part includes the groove.

(Aspect 11) The motor as defined in any one of Aspects 8 to 10, wherein the first movement restriction part is configured to restrict movement of the neutral point part to at least one of the first and second sides in the circumferential direction.

(Aspect 12) The motor as defined in Aspect 10 or 11, wherein the groove is closed on at least one of the first and second sides in the circumferential direction.

(Aspect 13) The motor as defined in Aspect 10 or 11, wherein the groove is open on one of the first and second sides in the circumferential direction.

(Aspect 14) The motor as defined in Aspect 13, wherein:
the outer wall part of the first electrical insulator assembly includes a second movement restriction part on the one of the first and second sides of the at least one projection in the circumferential direction; and
the second movement restriction part is configured to restrict movement of the neutral point part to the one of the first and second sides in the circumferential direction.

(Aspect 15) The motor as defined in Aspect 10 or 11, wherein the groove is open on the first and second sides in the circumferential direction.

(Aspect 16) The motor as defined in Aspect 15, wherein:
the outer wall part of the first electrical insulator assembly includes a second movement restriction part on each of the first and second sides of the at least one projection in the circumferential direction; and
the second movement restriction part arranged on the first side in the circumferential direction is configured to restrict movement of the neutral point part to the first side in the circumferential direction, and the second movement restriction part arranged on the second side in the circumferential direction is configured to restrict movement of the neutral point part to the second side in the circumferential direction.

(Aspect 17) The motor as defined in Aspect 14 or 16, wherein the second movement restriction part includes the projections other than the at least one projection.

(Aspect 18) The motor as defined in any one of Aspects 8 to 17, wherein the neutral point is a neutral point bus bar to which the second lead parts of the first to third phase stator windings are connected.

(Aspect 19) A compressor, having a compression mechanism part for compressing a working medium and a motor for driving the compression mechanism part, wherein:
the motor comprises the motor as defined in any one of Aspects 1 to 18.

The present disclosure is not limited to the structures described in the embodiment, but rather, may be added to, changed, replaced with alternatives or otherwise modified.

The present disclosure may be configured as a motor or a compressor.

Any of the features or structures described in the embodiment may be used individually or in combination of appropriately selected ones.

DESCRIPTION OF THE REFERENCE NUMERALS

10: compressor, 20: housing, 21: housing inner peripheral surface, 22: suction pipe, 23: discharge pipe, 30: motor, 40: stator, 50: rotor, 60: rotor core, 61: rotor core inner peripheral surface, 62: rotor core outer peripheral surface, 70: rotating shaft, 80: compression mechanism part, 81: cylinder, 82: eccentric rotor, 83: compression chamber, 83a: outlet port, 84, 85: bearing, 100: stator core, 100A, 100B: stator core end surface, 102: stator core outer peripheral surface, 103: notched surface, 104: passage, 110: yoke, 120: tooth, 121: tooth base, 122: tooth tip, 122a: tooth tip surface, 130: slot, 140: positioning recess, 200, 300: electrical insulator assembly, 200A, 300A: end surface, 201, 301: recess, 210, 310: outer wall part, 211: projection, 211A, 211B: projection (first movement restriction part), 211C, 211D: projection (second movement restriction part), 211a, 211b: groove, 212: notch, 213A to 213C: guide groove, 220, 320: inner wall part, 230: body part, 240: engagement recess (first engagement recess), 240A: insertion opening, 240a: locking surface (first locking surface), 250: projection, 251: positioning projection, 260: engagement recess (second engagement recess), 260a: locking surface (second locking surface), 400: stator winding, 400U, 400V, 400W: phase stator winding (U-phase, V-phase, W-phase), 400U1, 400V1, 400W1: first lead part, 400U2, 400V2, 400W2: second lead part, 401a to 401c: crossover part, 410: neutral point bus bar, 500, 600: cover, 510, 610: peripheral wall, 520, 620: top wall, 520a, 620a: opening, 521 to 523: wall part, 524: recess, 530, 630: locking piece (first locking piece), 531: claw (first claw), 531a: locking surface, 531b: inclined surface, 540: locking piece (second locking piece), 541: claw (second claw), 541a: locking surface, 541b: inclined surface, 550: opening

The invention claimed is:

1. A motor, comprising a rotor and a stator, wherein:
the stator includes a tubular stator core extending in an axial direction, first and second electrical insulator assemblies arranged respectively on a first side and a second side of the stator core in the axial direction, a stator winding and a cover;
the stator core includes a yoke extending in a circumferential direction around an axis of the stator core and a plurality of teeth each extending radially inward from the yoke;
each of the first and second electrical insulator assemblies includes an outer wall part that extends in the circumferential direction and the axial direction, a plurality of inner wall parts each of which is arranged radially inward of the outer wall part and extends in the circumferential direction and the axial direction, and a plurality of body parts each of which is arranged on the stator core side in the axial direction between the outer wall part and each of the inner wall parts and extends radially;
the stator winding includes a plurality of winding parts each wound around at least one of the plurality of teeth of the stator core;
the cover includes a peripheral wall and a top wall, the peripheral wall being arranged radially outside the outer wall part of the first electrical insulator assembly and extending in the circumferential direction and the axial direction, the top wall being connected to an end of the peripheral wall on the first side in the axial direction and extending radially and in the circumferential direction and being arranged on the first side of the outer wall part of the first electrical insulator assembly in the axial direction;
the peripheral wall of the cover includes at least two locking fingers each of which is formed at one of at least two first positions that are spaced apart from each other in the circumferential direction;

the outer wall part of the first electrical insulator assembly includes at least two locking surfaces each of which is formed at one of at least two second positions that are spaced apart from each other in the circumferential direction and correspond to the at least two first positions, each of the locking surfaces being configured to be engaged by the one of the at least two locking fingers formed at the corresponding first position; and a first one of at least two first positions of the top wall of the cover that corresponds circumferentially to a first one of the at least two first positions of the peripheral wall is imperforate.

2. The motor as defined in claim 1, wherein:

a first locking finger of the at least two locking fingers at the first one of the at least two first positions of the peripheral wall of the cover has a first claw protruding radially outward;

at a position of a first one of the at least two second positions of the outer wall part of the first electrical insulator assembly that corresponds to the first one of the at least two first positions of the peripheral wall of the cover, the outer wall part of the first electrical insulator assembly includes a first radially outwardly extending projection having a first engagement recess;

a first one of the at least two locking surfaces has an edge at the first engagement recess; and the first claw engages the first one of the at least two locking surfaces.

3. The motor as defined in claim 1, wherein:

the stator winding includes first, second and third phase stator windings, each of the first, second and third phase stator windings including winding parts, a first lead part that is connected to a power supply, and a second lead part that is connected in common;

the stator includes a neutral point bus bar to which the second lead parts of the first, second and third phase stator windings are connected in common;

the peripheral wall of the cover includes at least one recess that extends in the circumferential direction and the axial direction and is open on the second side in the axial direction; and the neutral point bus bar is mounted to the outer wall part of the first electrical insulator assembly in the recess of the peripheral wall of the cover.

4. The motor as defined in claim 2, wherein:

the first radially outward extending projection has a positioning projection that protrudes to the second side in the axial direction; and an outer peripheral surface of the stator core has a positioning recess that extends in the axial direction and is open on the first side in the axial direction; and the positioning projection is located in the positioning recess.

5. The motor as defined in claim 2, wherein the first locking finger extends in the axial direction and is configured such that an end part of the first locking finger on the second side in the axial direction is elastically radially deformable relative to an end part of the first locking finger on the first side in the axial direction, and the first claw is formed at the end part of the first locking finger on the second side in the axial direction.

6. The motor as defined in claim 5, wherein:

the first radially outward extending projection has a positioning projection that protrudes to the second side in the axial direction; and

an outer peripheral surface of the stator core has a positioning recess that extends in the axial direction and is open on the first side in the axial direction; and the positioning projection is located in the positioning recess.

7. The motor as defined in claim 6, wherein:

the stator winding includes first, second and third phase stator windings, each of the first, second and third phase stator windings including winding parts, a first lead part that is connected to a power supply, and a second lead part that is connected in common;

the stator includes a neutral point bus bar to which the second lead parts of the first, second and third phase stator windings are connected in common;

the peripheral wall of the cover includes at least one recess that extends in the circumferential direction and the axial direction and is open on the second side in the axial direction; and the neutral point bus bar is mounted to the outer wall part of the first electrical insulator assembly in the recess of the peripheral wall of the cover.

8. The motor as defined in claim 2, wherein the first engagement recess has a closed periphery.

9. The motor as defined in claim 8, wherein:

the first radially outward extending projection has a positioning projection that protrudes to the second side in the axial direction; and an outer peripheral surface of the stator core has a positioning recess that extends in the axial direction and is open on the first side in the axial direction; and the positioning projection is located in the positioning recess.

10. The motor as defined in claim 9, wherein:

the stator winding includes first, second and third phase stator windings, each of the first, second and third phase stator windings including winding parts, a first lead part that is connected to a power supply, and a second lead part that is connected in common;

the stator includes a neutral point bus bar to which the second lead parts of the first, second and third phase stator windings are connected in common;

the peripheral wall of the cover includes at least one recess that extends in the circumferential direction and the axial direction and is open on the second side in the axial direction; and the neutral point bus bar is mounted to the outer wall part of the first electrical insulator assembly in the recess of the peripheral wall of the cover.

11. The motor as defined in claim 2, wherein:

a second locking finger of the at least two locking fingers at a second one of the at least two first positions of the peripheral wall of the cover has a second claw protruding radially inward;

a second one of the at least two second positions of the outer wall part of the first electrical insulator assembly that corresponds to the second one of the at least two first positions of the peripheral wall of the cover includes a second engagement recess; and a second one of the at least two locking surfaces extends from the second engagement recess.

12. The motor as defined in claim 11, wherein:

the first radially outward extending projection has a positioning projection that protrudes to the second side in the axial direction; and an outer peripheral surface of the stator core has a positioning recess that extends in the axial direction and is open on the first side in the axial direction; and the positioning projection is located in the positioning recess.

13. The motor as defined in claim 12, wherein:

the stator winding includes first, second and third phase stator windings, each of the first, second and third phase stator windings including winding parts, a first lead part that is connected to a power supply, and a second lead part that is connected in common;

the stator includes a neutral point bus bar to which the second lead parts of the first, second and third phase stator windings are connected in common;

the peripheral wall of the cover includes at least one recess that extends in the circumferential direction and the axial direction and is open on the second side in the axial direction; and the neutral point bus bar is mounted to the outer wall part of the first electrical insulator assembly in the recess of the peripheral wall of the cover.

* * * * *